US012691876B2

(12) United States Patent
Ueno et al.

(10) Patent No.: US 12,691,876 B2
(45) Date of Patent: Jul. 28, 2026

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Kentaro Ueno, Hitachinaka (JP); Daisuke Noma, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 173 days.

(21) Appl. No.: 17/796,468

(22) PCT Filed: Jan. 27, 2021

(86) PCT No.: PCT/JP2021/002863
§ 371 (c)(1),
(2) Date: Jul. 29, 2022

(87) PCT Pub. No.: WO2021/153622
PCT Pub. Date: Aug. 5, 2021

(65) Prior Publication Data
US 2023/0347888 A1 Nov. 2, 2023

(30) Foreign Application Priority Data

Jan. 30, 2020 (JP) ................................. 2020-013234

(51) Int. Cl.
*B60W 50/00* (2006.01)
*B60W 30/14* (2006.01)

(52) U.S. Cl.
CPC ...... *B60W 30/143* (2013.01); *B60W 50/0098* (2013.01); *B60W 2520/125* (2013.01); *B60W 2552/20* (2020.02); *B60W 2554/00* (2020.02)

(58) Field of Classification Search
CPC ........... B60W 30/143; B60W 50/0098; B60W 2554/00; B60W 2552/20;
(Continued)

(56) References Cited

U.S. PATENT DOCUMENTS 11,181,922 B2 * 11/2021 Reschka ............ G01C 21/3815
2010/0312417 A1 * 12/2010 Wakabayashi ........ G06F 1/3215
701/1
(Continued)

FOREIGN PATENT DOCUMENTS

DE 19934670 B4 * 7/2004 ........... G01S 17/931
JP 2016-71566 A 5/2016
(Continued)

OTHER PUBLICATIONS

English translation of DE-19934670-B4 (Year: 2004).*
(Continued)

*Primary Examiner* — Matthias S Weisfeld
*Assistant Examiner* — Preston Jay Miller
(74) *Attorney, Agent, or Firm* — Crowell & Moring LLP

(57) ABSTRACT

A vehicle control device, a vehicle control method, and a vehicle control system according to the present invention acquire a first driving area in front of a vehicle, the first driving area being included in a first target command specified by a recognition and determination unit that performs recognition and determination, output a first control command for driving the vehicle at a velocity and on a driving path that are based on a specification relating to driving of the vehicle in the first driving area, acquire a second driving area that partly overlaps the first driving area in front of the vehicle while the vehicle is running in the first driving area, the second driving area being included in a second target command specified by the recognition and determination unit, and output a second control command for driving the vehicle at a velocity and on a driving path that are based on a specification relating to driving of the vehicle in the second driving area. In this way, ride quality and comfort of a vehicle can be improved.

14 Claims, 26 Drawing Sheets

(58) Field of Classification Search
CPC ....... B60W 2520/125; B60W 2552/15; B60W
2552/50; B60W 60/0011; B60W 2552/35;
B60W 2552/53; B60W 2554/60; B60W
60/0013; B60W 2552/10; B60W 2552/40;
B60W 2554/20; B60W 2554/40; B60W
2554/80; B60W 2556/40; B60W 2556/50;
B60W 2720/10; B60W 2720/106; B60W
2720/125; G08G 1/165; G08G 1/166
USPC ........................................................ 701/96
See application file for complete search history.

(56) References Cited

U.S. PATENT DOCUMENTS

| | | | |
|---|---|---|---|
| 2012/0166058 A1 * | 6/2012 | Armbrust .............. | B60W 30/17 701/1 |
| 2017/0236422 A1 * | 8/2017 | Naka ...................... | G08G 1/165 701/301 |
| 2017/0274898 A1 * | 9/2017 | Nakamura ............. | G06V 20/58 |
| 2017/0330033 A1 * | 11/2017 | Tokimasa ............... | G06V 20/10 |
| 2019/0129439 A1 | 5/2019 | Kishi et al. | |
| 2019/0176836 A1 | 6/2019 | Yanakiev et al. | |
| 2019/0308621 A1 | 10/2019 | Inou et al. | |
| 2019/0344762 A1 * | 11/2019 | Alfter ........................ | B60T 8/17 |
| 2020/0003564 A1 | 1/2020 | Zhang | |
| 2020/0047753 A1 | 2/2020 | Kato et al. | |
| 2020/0164870 A1 * | 5/2020 | Takahashi ........... | B60W 30/045 |
| 2020/0191586 A1 * | 6/2020 | Luo .................... | G01C 21/3492 |
| 2020/0353918 A1 | 11/2020 | Goto et al. | |
| 2021/0114619 A1 | 4/2021 | Mimura | |
| 2024/0043039 A1 * | 2/2024 | Watanabe ....... | B60W 30/18163 |

FOREIGN PATENT DOCUMENTS

| | | |
|---|---|---|
| JP | 2016-107658 A | 6/2016 |
| JP | 2017-100652 A | 6/2017 |
| JP | 2019-34591 A | 3/2019 |
| JP | 2019-43193 A | 3/2019 |
| JP | 2019-84873 A | 6/2019 |
| WO | WO 2018/073886 A1 | 4/2018 |
| WO | WO 2018/100619 A1 | 6/2018 |

OTHER PUBLICATIONS

International Search Report (PCT/ISA/210) issued in PCT Application No. PCT/JP2021/002863 dated Apr. 20, 2021 with English translation (four (4) pages).
Japanese-language Written Opinion (PCT/ISA/237) issued in PCT Application No. PCT/JP2021/002863 dated Apr. 20, 2021 (three (3) pages).
International Preliminary Report on Patentability (PCT/IB/338 & PCT/IB/373) issued in PCT Application No. PCT/JP2021/002863 dated Aug. 11, 2022, including English translation of document C2 (Japanese-language Written Opinion (PCT/ISA/237) filed on Jul. 29, 2022) (six (6) pages).
Extended European Search Report issued in European Application No. 21747506.0 dated Jun. 22, 2023 (8 pages).
Japanese-language Office Action issued in Japanese Application No. 2025-053461 dated Apr. 28, 2026 with English translation (6 pages).

* cited by examiner

FIG.1

ROAD SURFACE CANT (AVERAGE VALUE)
ROAD SURFACE SLOPE (AVERAGE VALUE)
ROAD SURFACE μ (AVERAGE VALUE)

SPECIFIED AREA

100

ASYNCHRONOUS RIGHT AND LEFT POINTS

MAXIMUM VELOCITY
MINIMUM VELOCITY
MAXIMUM LATERAL ACCELERATION
MAXIMUM LATERAL JERK

SPECIFIED AREA

100

YAW RATE [rad/s]

PRESENT INVENTION

CENTER OF TRAFFIC LANE

TIME [s]

LATERAL
ACCELERATION [m/s²]

PRESENT INVENTION

CENTER OF TRAFFIC LANE

TIME [s]

SPECIFIED AREA

AREA OF WHICH DRIVING PROBABILITY IS HIGH

PATH THAT VEHICLE HAS ACTUALLY RUN

《SITE I》

《SITE II》

《SITE III》

VEHICLE CONTROL DEVICE, VEHICLE CONTROL METHOD, AND VEHICLE CONTROL SYSTEM

TECHNICAL FIELD

The present invention relates to a vehicle control device, to a vehicle control method, and to a vehicle control system.

BACKGROUND ART

Patent Document 1 discloses a steering control device of a vehicle. The steering control device sets a preview point distance based on information about a driving lane and the driving state of the vehicle, and calculates a first feedback gain for the vehicle to track the driving lane based on the preview point distance and the driving state of the vehicle. In addition, the steering control device calculates a second feedback gain for correcting lateral displacement of the vehicle at the current point based on the first feedback gain and a stability parameter. In addition, the steering control device calculates a target yaw rate by using the first feedback gain, second feedback gain, preview point lateral displacement, and current point lateral displacement and calculates the steering angle of the vehicle based on this target yaw rate.

REFERENCE DOCUMENT LIST

Patent Document

Patent Document 1: JP2016-107658 A

SUMMARY OF THE INVENTION

Problem to be Solved by the Invention

There is a system in which a recognition and determination unit that recognizes and determines the situation and the like around a vehicle generates a target driving path based on its recognition and determination result, and a vehicle control unit controls the motion of the vehicle such that the vehicle runs on the target driving path. In this system, ride quality or comfort of the vehicle may be deteriorated, depending on the target driving path.

The present invention has been made in view of these actual circumstances, and it is an object of the present invention to provide a vehicle control device, a vehicle control method, and a vehicle control system that improve ride quality and comfort of a vehicle.

Means for Solving the Problem

According to an aspect of the present invention, there is provided a vehicle control device including: a control unit that performs calculation based on input information and outputs a calculation result, in which the control unit acquires a first driving area in front of a vehicle, the first driving area being included in a first target command specified by a recognition and determination unit that performs recognition and determination, outputs a first control command for driving the vehicle at a velocity and on a driving path that are based on a specification relating to driving of the vehicle in the first driving area, acquires a second driving area that partly overlaps the first driving area in front of the vehicle while the vehicle is running in the first driving area, the second driving area being included in a second target command specified by the recognition and determination unit, and outputs a second control command for driving the vehicle at a velocity and on a driving path that are based on a specification relating to driving of the vehicle in the second driving area.

Effects of the Invention

According to the present invention, ride quality and comfort of a vehicle are improved.

BRIEF DESCRIPTION OF THE DRAWINGS

FIG. 1 is a block diagram illustrating a vehicle control system.

FIG. 25 illustrates a driving path when a recommended path specified by the recognition and determination unit includes a factor that deteriorates ride quality or the like.

FIG. 31 is a block diagram of a vehicle control system including a single microcomputer on which a first logic as a recognition and determination unit and a second logic as a control unit are mounted.

FIG. 32 is a block diagram of a vehicle control system illustrating a mode in which the two microcomputers are assigned functions differently.

MODE FOR CARRYING OUT THE INVENTION

Figure 2:
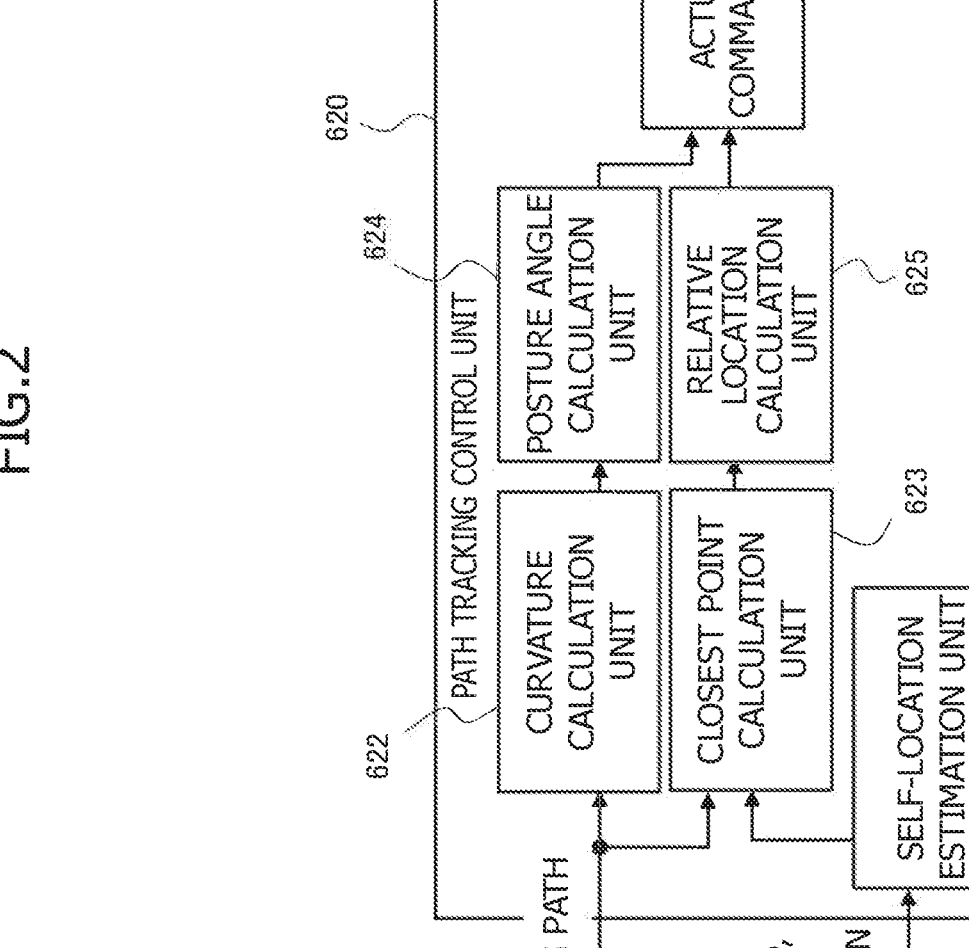
FIG. 2 is a block diagram illustrating a path tracking control unit.

Hereinafter, examples of a vehicle control device, a vehicle control method, and a vehicle control system according to the present invention will be described with reference to the drawings.

Figure 1:
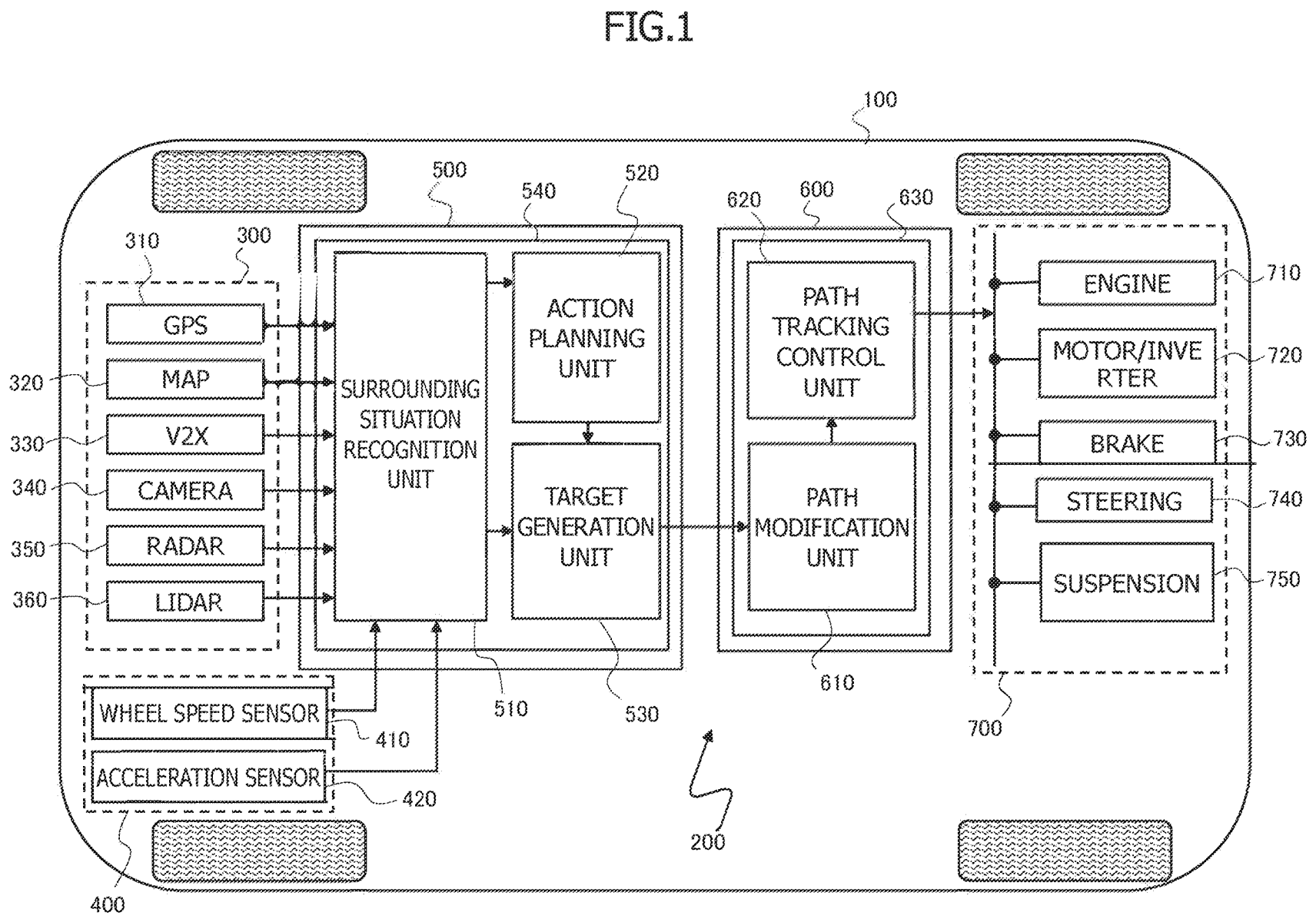

FIG. 1 is a block diagram illustrating a mode of a vehicle control system 200, which is a system that is mounted on a vehicle 100 such as a four-wheeled vehicle and that controls the motion of vehicle 100.

Vehicle control system 200 includes an external information recognition unit 300, a vehicle motion detection unit 400, an automated driving control unit 500, a vehicle motion control unit 600, and an actuator unit 700.

As will be described below, automated driving control unit 500 is an upper unit that gives a target command to vehicle motion control unit 600, and vehicle motion control unit 600 is a lower unit that acquires the target command from automated driving control unit 500.

External information recognition unit 300 acquires external information about vehicle 100.

External information recognition unit 300 includes, for example, a GPS (Global Positioning System) reception unit 310, a map database 320, a road-to-vehicle communication device 330, a camera 340, a radar 350, and a LiDAR (Light Detection and Ranging, Laser Imaging Detection and Ranging) 360.

GPS reception unit 310 measures the longitude and latitude of the location of vehicle 100 by receiving signals from a GPS satellite.

Map database 320 is configured in a storage device mounted on vehicle 100.

The map information in map database 320 includes information about road locations, road shapes, intersection locations, etc.

Road-to-vehicle communication device 330 transmits information about vehicle 100 to roadside devices and receives road traffic information such as about curves and intersections from roadside devices.

External information recognition unit 300 may include a communication device that acquires, for example, road traffic information and behavior information about other vehicles from other vehicles.

Camera 340 is a stereo camera, a monocular camera, a 360-degree camera, or the like. Camera 340 captures images around vehicle 100 and acquires information about the images around vehicle 100.

Radar 350 and LiDAR 360 detect objects around vehicle 100 and output information about the detected objects.

Vehicle motion detection unit 400 includes a wheel speed sensor 410 and an acceleration sensor 420, for example.

Wheel speed sensor 410 is a sensor that detects the rotation velocity of each wheel of vehicle 100, and the detection result obtained by wheel speed sensor 410 is used to estimate the velocity of vehicle 100.

Vehicle motion detection unit 400 may include a vehicle velocity sensor that detects the velocity of vehicle 100, in place of, or in addition to, wheel speed sensor 410.

In addition, acceleration sensor 420 detects, for example, the longitudinal acceleration, the lateral acceleration, the vertical acceleration, the yaw rate, the pitch rate, the roll rate, and the lateral jerk of vehicle 100.

Automated driving control unit 500 is an electronic control device including a microcomputer 540 as a main component that performs calculation based on input information and outputs calculation results. Microcomputer 540 includes, for example, a microprocessor unit (MPU), a read-only memory (ROM), a random access memory (RAM) (not illustrated).

Microcomputer 540 in automated driving control unit 500 acquires external information recognition signals such as location information about vehicle 100, road shape information, road surface information, and object information from external information recognition unit 300, and acquires vehicle motion detection signals (in other words, vehicle behavior detection signals) such as the velocity and the acceleration from vehicle motion detection unit 400.

Microcomputer 540 in automated driving control unit 500 calculates a target command based on the acquired information and outputs the calculated target command to vehicle motion control unit 600.

Microcomputer 540 in automated driving control unit 500 includes a surrounding situation recognition unit 510, an action planning unit 520, and a target generation unit 530 as software functions.

Surrounding situation recognition unit 510 recognizes the situation around vehicle 100 based on the external information recognition signals from external information recognition unit 300 and the vehicle motion detection signals from vehicle motion detection unit 400.

The situation around vehicle 100 recognized by surrounding situation recognition unit 510 includes, for example, information about a road curvature, cant of a road surface, a road surface gradient, a road surface friction coefficient μ, locations of right and left lane markers (markings), locations of right and left road edges, moving objects, stationary objects, etc.

The moving objects are, for example, pedestrians, bicycles, motorcycles, and other vehicles. The stationary objects are, for example, fallen objects on the road, traffic lights, guardrails, curbs, road signs, trees, and signboards.

Action planning unit 520 acquires a recognition result from surrounding situation recognition unit 510 and creates an action plan for vehicle 100. The action plan includes, for example, a selected driving lane and a selected traveling direction at an intersection or a branch point.

In addition, target generation unit 530 determines a target command to be output to vehicle motion control unit 600, based on the situation around vehicle 100 recognized and determined by surrounding situation recognition unit 510 and the action plan created by action planning unit 520.

The target command that command target generation unit 530 specifies to vehicle motion control unit 600 includes a command specifying a driving area in front of vehicle 100.

That is, microcomputer 540 in automated driving control unit 500 corresponds to a recognition and determination unit that recognizes and determines the situation around vehicle 100 based on the external information about vehicle 100 acquired by external information recognition unit 300 and that outputs information specifying a driving area as the target command.

As is the case with automated driving control unit 500, vehicle motion control unit 600 is an electronic control device including a microcomputer 630 as a main component that performs calculation based on input information and that outputs calculation results. Microcomputer 630 includes an MPU, a ROM, a RAM, etc., not illustrated.

Microcomputer 630 in vehicle motion control unit 600 is a vehicle control device having a function as a control unit.

The control unit acquires the target command including the information specifying a driving area from automated driving control unit 500, and outputs a control command for driving vehicle 100 at a velocity and on a driving path that are based on specifications relating to driving of vehicle 100 to actuator unit 700.

The specifications relating to driving of the vehicle are physical quantities that minimize lateral acceleration or lateral jerk that occurs in vehicle 100.

Microcomputer 630 in vehicle motion control unit 600 includes software functions corresponding to a path modification unit 610 and a path tracking control unit 620.

Path modification unit 610 generates a target driving path of vehicle 100 within the driving area specified by automated driving control unit 500 and sets a target vehicle velocity.

Path modification unit 610 sets a target driving path and a target vehicle velocity, for example, as a driving path and a vehicle velocity that reduce lateral acceleration or lateral jerk as much as possible (that, in other words, minimize lateral acceleration or lateral jerk) within the driving area specified by automated driving control unit 500.

If the driving area specified by automated driving control unit 500 includes an object, path modification unit 610 calculates, as the target driving path, a route on which vehicle 100 avoids the object.

Path tracking control unit 620 calculates a control command for driving vehicle 100 on the target driving path and at the target vehicle velocity set by path modification unit 610, that is, calculates a steering command and an acceleration or deceleration command, and outputs the calculated control command to actuator unit 700.

Actuator unit 700 includes, for example, an internal-combustion engine 710 and a motor 720 that generate driving force for vehicle 100, a brake device 730 that applies braking force to vehicle 100, an electronically controlled power steering device 740 for changing the traveling direction of vehicle 100, and an electronically controlled suspension 750 that is capable of adjusting the damping force and vehicle height.

Motor 720 may be operated as a generator to apply braking force (in other words, regenerative braking force) to vehicle 100.

Actuator unit 700 generates driving force, braking force, steering force, etc., based on the control command from path tracking control unit 620.

FIG. 2 is a block diagram illustrating details of path tracking control unit 620.

Path tracking control unit 620 includes a self-location estimation unit 621, a curvature calculation unit 622, a closest point calculation unit 623, a posture angle calculation unit 624, a relative location calculation unit 625, and an actuator command unit 626.

Self-location estimation unit 621 estimates the location of vehicle 100 by performing so-called dead reckoning, based on integral values of the wheel speed, the yaw rate, the longitudinal acceleration, the lateral acceleration, etc., obtained from vehicle motion detection unit 400, for example.

Curvature calculation unit 622 calculates the curvature of the target driving path set by path modification unit 610 and also calculates change of the curvature.

Closest point calculation unit 623 calculates the closest point, which is the point closest to the location of vehicle 100 on the target driving path.

Posture angle calculation unit 624 calculates the posture angle of vehicle 100 necessary for matching the traveling direction of vehicle 100 at the closest point calculated by closest point calculation unit 623 with the yaw angle at the closest point, that is, the direction of tangent of the target path, based on the curvature of the target driving path and change of the curvature calculated by curvature calculation unit 622.

The posture angle is the angle made by the traveling direction of vehicle 100 and the longitudinal axis direction of vehicle 100.

Relative location calculation unit 625 calculates the relative location of the closest point calculated by closest point calculation unit 623 with respect to the location of vehicle 100 estimated by self-location estimation unit 621.

Next, actuator command unit 626 corrects the yaw angle at the closest point based on the posture angle calculated by posture angle calculation unit 624, generates a steering command and an acceleration or deceleration command for causing vehicle 100 to pass through the closest point at the target vehicle velocity and the corrected yaw angle, and outputs the generated commands to actuator unit 700.

The steering command output by actuator command unit 626 includes, for example, a yaw rate command, a lateral location command, a yaw angle command, etc.

Automated driving control unit 500 can specify an area between right and left road lane markers (such as white lines), or an area between right and left road edges as a driving area to vehicle motion control unit 600.

In other words, automated driving control unit 500 can set an area within the traffic lane recognized by lane markers or the like as a basic driving area.

In addition, if there is some object within the traffic lane recognized by the lane markers or the like, automated driving control unit 500 can specify an area that does not include this object as the driving area.

This object is, for example, a stopped vehicle, a preceding vehicle, an oncoming vehicle, a fallen object, an installed object, a tree, a utility pole, a pedestrian, a signboard, or the like.

In addition, automated driving control unit 500 can set, for example, an area behind an object as a collision risk area on the alert for sudden appearance of an object from behind the object and can specify an area that does not include this collision risk area as the driving area.

In addition, if there is an area that could not be recognized in front of vehicle 100, automated driving control unit 500 can specify an area that does not include this unrecognized area as the driving area.

In addition, automated driving control unit 500 can add road surface information, object information, etc., to the target command that is output to vehicle motion control unit 600.

The road surface information is information about road surface friction coefficient μ, cant of a road surface, a road surface slope, an undulating road surface, unevenness of the road surface, a speed bump, a pothole, etc.

The object information is information about an object located within the driving area, and examples of the object information include another vehicle, a pedestrian, an obstacle, a fallen object, and a signboard.

In addition, automated driving control unit 500 can add information about the maximum value or minimum value of the vehicle velocity, the lateral acceleration, the lateral jerk, etc., at a predetermined location in the driving area to the target command that is output to vehicle motion control unit 600.

In this case, vehicle motion control unit 600 calculates a target driving path on which vehicle 100 can run at the lateral acceleration or the lateral jerk specified by automated driving control unit 500 within the driving area specified by automated driving control unit 500.

Figure 3:
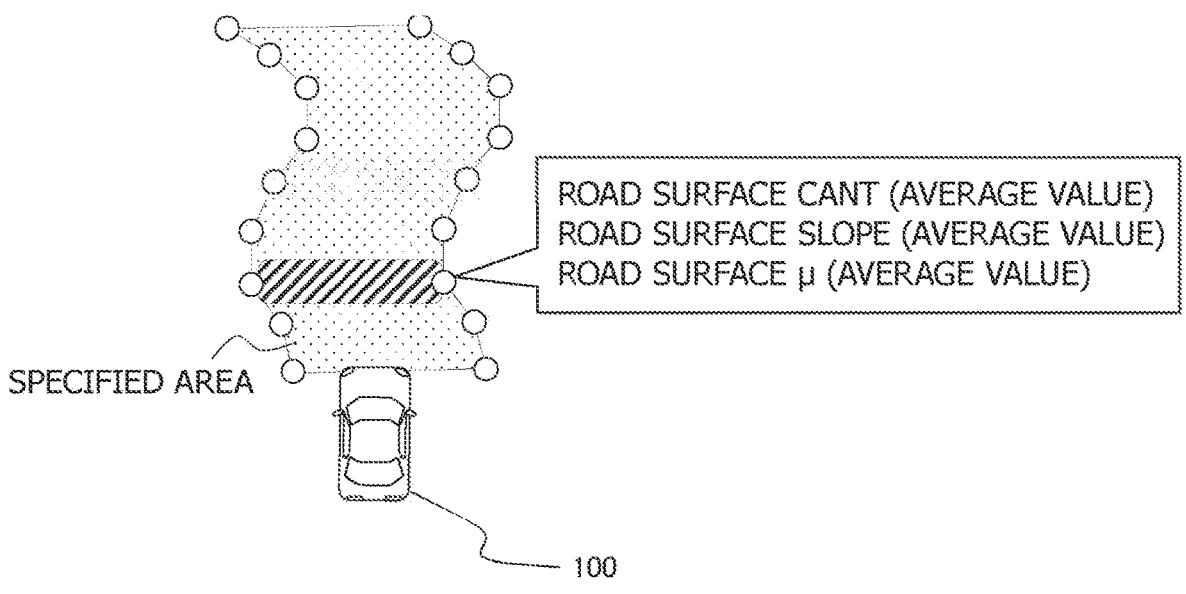
FIG. 3 illustrates a mode of the content of a target command.

FIG. 3 illustrates a mode of the content of the target command that automated driving control unit 500 outputs to vehicle motion control unit 600.

The target command illustrated as an example in FIG. 3 specifies a driving area that is located away from the current location of vehicle 100 by a predetermined distance, by specifying a combination of location information about a right edge of the driving area and location information about a left edge of the driving area (see "SPECIFIED AREA" in FIG. 3).

In this example, automated driving control unit 500 determines which one of a minimum interval or a minimum time interval is longer and specifies a combination of location information about a right edge of a driving area and location information about a left edge of the driving area as points per determined minimum interval or minimum time interval. The total number of combinations of location information about the right and left edges of a driving area is determined as a predetermined number, a number corresponding to a predetermined distance, or a number corresponding to a predetermined time.

In addition, in the example illustrated in FIG. 3, for each combination of location information about right and left edges of a driving area, road surface information such as the cant of the road surface, the road surface slope, and road surface friction coefficient μ at the site represented by the corresponding location information are added.

The individual driving area (in other words, the specified area) described above is specified by a combination of location information about a right edge at a site and location information about a left edge at the same site. However, location information about the right edge of a site and location information about the left edge of a different site may be given. In other words, in the information specifying a driving area, the location information about the right edge and the location information about the left edge may be asynchronous with each other.

Figure 4:
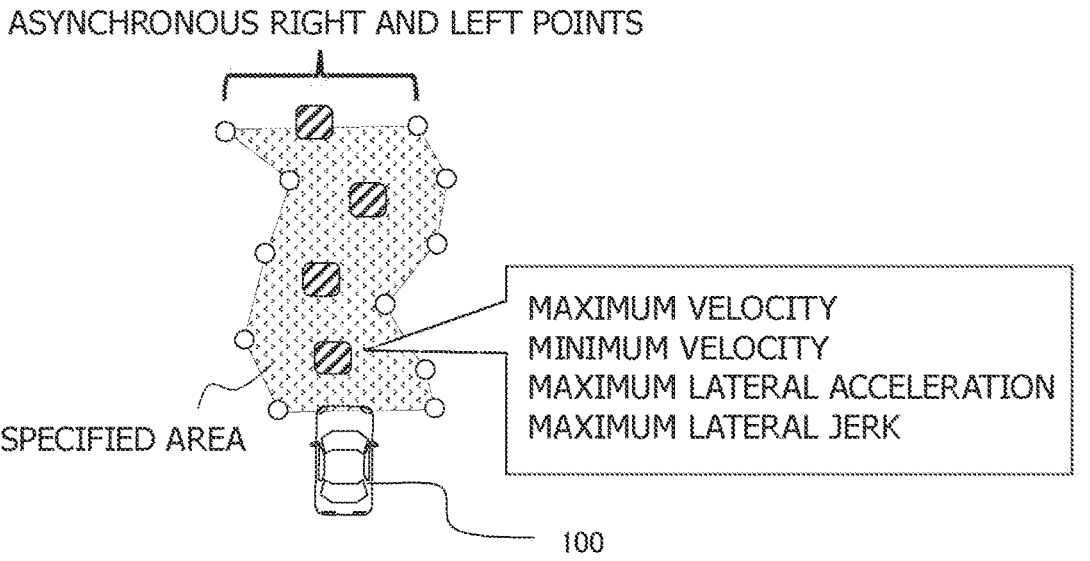
FIG. 4 illustrates another mode of the content of the target command.

FIG. 4 illustrates the content of a target command when a driving area instruction command (in other words, the specified area) includes location information about a right edge at one site and location information about a left edge at a different site.

The target command illustrated in FIG. 4 includes information about the maximum velocity, minimum velocity, maximum lateral acceleration, maximum lateral jerk, etc., per predetermined site.

For example, the maximum velocity is the legal maximum speed limit, and the minimum velocity is the legal minimum speed limit or a predetermined minimum speed limit that does not disturb the traffic flow.

In addition, for example, the maximum lateral acceleration of vehicle 100 is a value set based on, for example, ride quality of vehicle 100 or the maximum lateral acceleration allowable by automated driving, and the maximum lateral jerk of vehicle 100 is a value set based on, for example, ride quality of vehicle 100.

Figure 5:
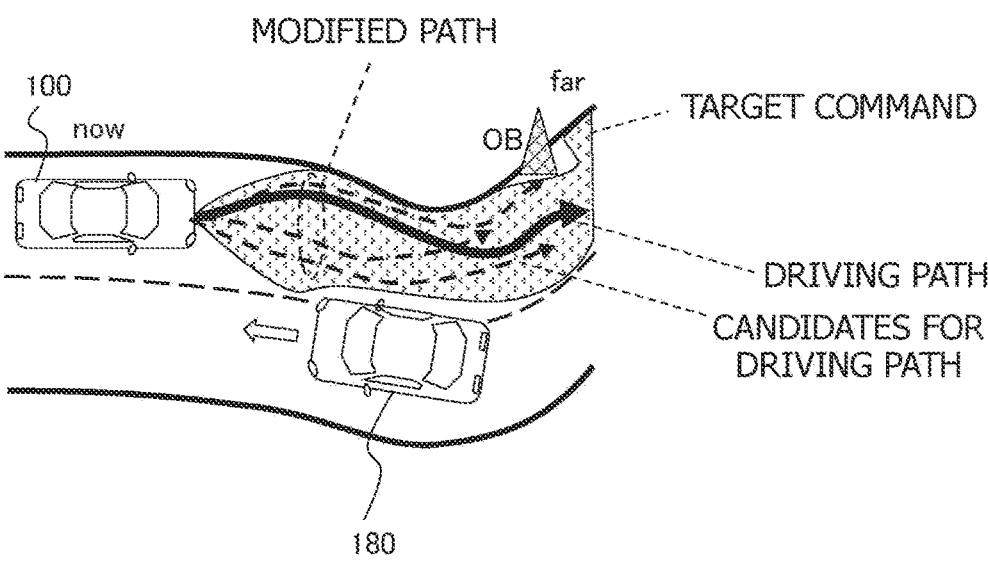
FIG. 5 illustrates a modified path in a target driving area.

FIG. 5 illustrates a driving area specified by automated driving control unit 500 and a target driving path set by vehicle motion control unit 600 on a curve.

In FIG. 5, a hatched area is the driving area specified by automated driving control unit 500. Automated driving control unit 500 specifies, as the driving area, an area obtained by removing an area including an object OB indicated by a triangle in FIG. 5 from the traffic lane. In addition, automated driving control unit 500 specifies this driving area such that vehicle 100 can avoid an oncoming vehicle 180.

Vehicle motion control unit 600 drives vehicle 100 at a vehicle velocity and on a path that are based on specifications relating to driving of vehicle 100 within the specified driving area.

Thus, vehicle motion control unit 600 can suitably select from among candidates for the driving path a velocity and a path that can ensure safety based on object information and that can achieve good ride quality with a reduced maximum lateral jerk, etc.

Figure 6:
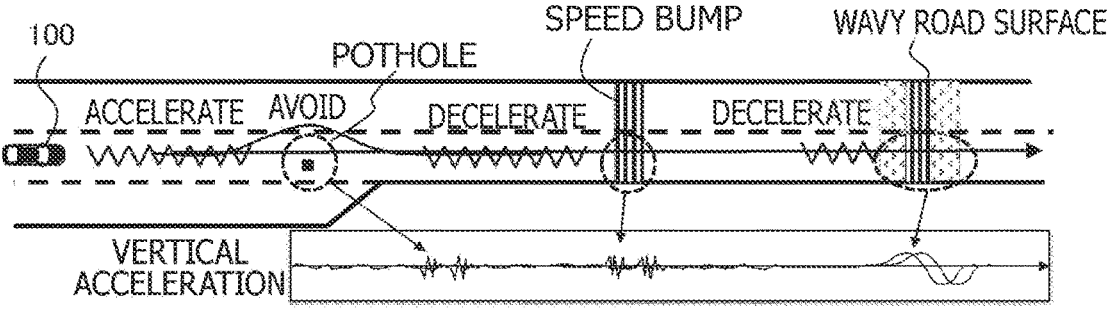
FIG. 6 illustrates setting examples of a target driving trajectory and a target vehicle velocity based on road surface information.

In addition, FIG. 6 illustrates examples of a target vehicle velocity and a target driving path set by vehicle motion control unit 600 when information about the driving area specified by automated driving control unit 500 includes road surface information.

FIG. 6 illustrates an example of a vehicle behavior control result obtained by vehicle motion control unit 600 when on a straight path in the driving area in front of vehicle 100 includes a pothole, a speed bump, and an undulating road surface, and this road surface information is given by automated driving control unit 500 to vehicle motion control unit 600 along with instructions about the driving area.

In the case of the example illustrated in FIG. 6, vehicle motion control unit 600 sets a target driving path that bypasses the pothole, sets a target vehicle velocity such that vehicle 100 decelerates before the speed bump and the undulating road surface, and controls actuator unit 700 in accordance with the set target driving path and target vehicle velocity.

If vehicle 100 runs in accordance with the above target driving path and target vehicle velocity, vehicle 100 can experience less vertical acceleration (in other words, vertical vibration) when passing through the pothole, the speed bump, and the undulating road surface, and therefore, ride quality of vehicle 100 can be improved.

Instead of setting a path that bypasses the pothole, vehicle motion control unit 600 may set a target vehicle velocity that accelerates vehicle 100 before the pothole.

By accelerating vehicle 100 before the pothole, the tires of vehicle 100 can be prevented from significantly falling into the pothole, and vehicle 100 can be prevented from experiencing significant vertical acceleration.

Figure 7:
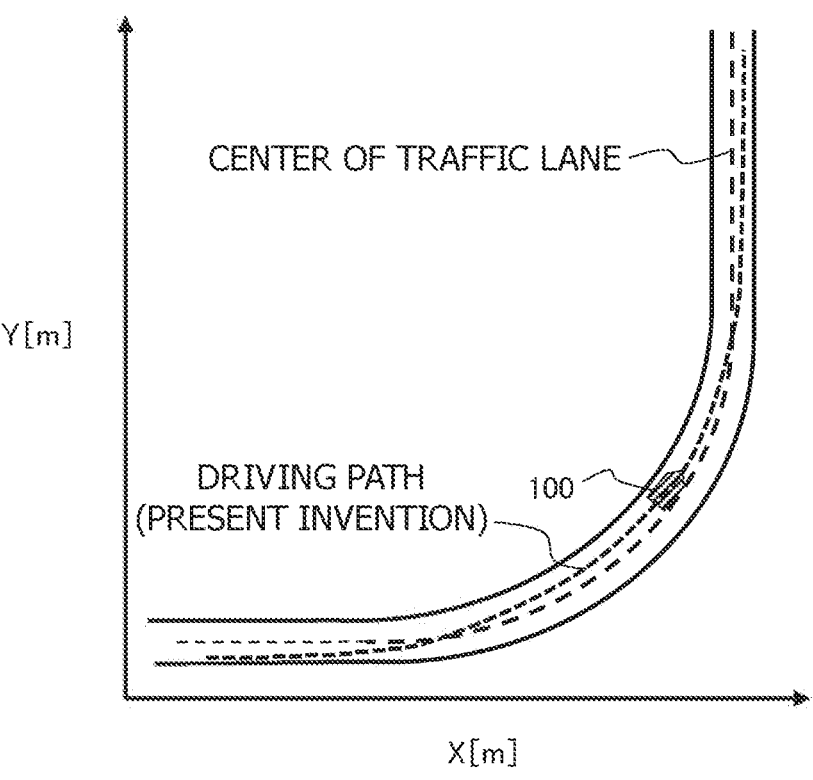
FIG. 7 illustrates the difference in trajectory between a driving path based on a target driving area and the center of a traffic lane.

FIG. 7 illustrates an example of a driving path on a curve when vehicle motion control unit 600 drives vehicle 100 at a vehicle velocity and on a path that reduce the lateral acceleration or lateral jerk as much as possible within the driving area specified by automated driving control unit 500.

FIGS. 8 to 11 each illustrate the difference in the curvature of a driving path, yaw rate, lateral acceleration, and lateral jerk, that is, the difference in the behavior of vehicle 100, between when vehicle 100 runs on a target driving path that traces the center of the traffic lane and when vehicle 100 runs on a target driving path that minimizes the lateral jerk.

For vehicle 100 running on a curve to experience less lateral jerk, the curvature of the driving path of vehicle 100 needs to be less.

Thus, to reduce the lateral jerk as much as possible within the driving area specified by automated driving control unit 500, vehicle motion control unit 600 needs to set a target driving path such that the curvature of the driving path within the specified driving area becomes as small as possible. In other words, vehicle motion control unit 600 needs to set a target driving path such that vehicle 100 runs as linearly as possible.

Specifically, in the case of a left curve illustrated in FIG. 7, vehicle motion control unit 600 sets a target driving path such that vehicle 100 enters the curve from the right side in the driving area, runs toward the inside of the curve, and runs on the right side in the driving area again at the exit from the curve. In other words, vehicle motion control unit 600 sets a target driving path such that vehicle 100 runs on an out-in-out driving line.

Figure 8:
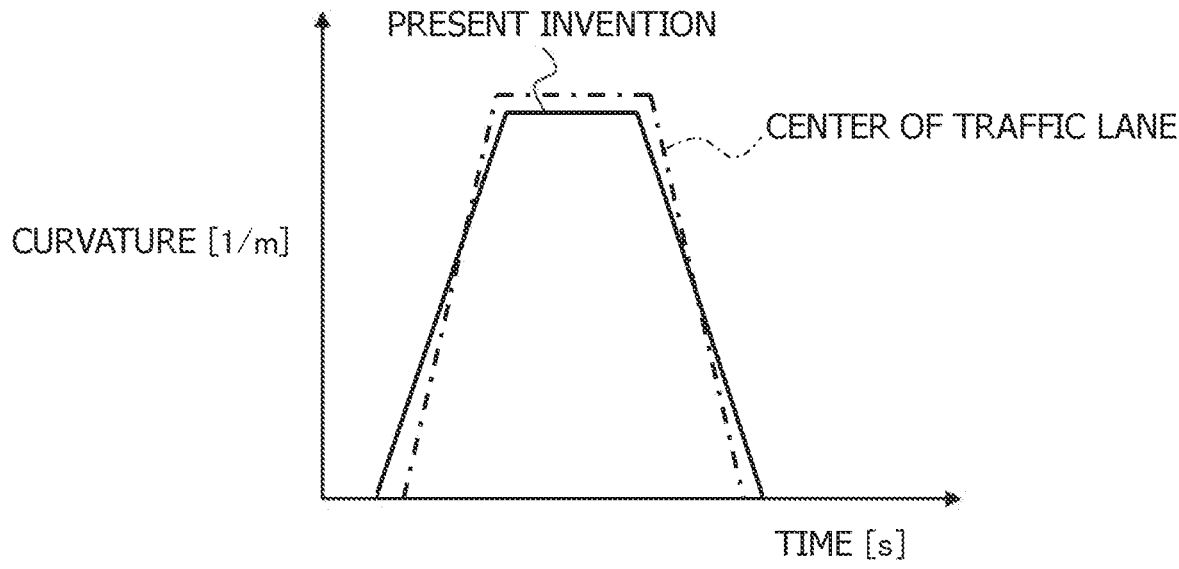
FIG. 8 illustrates the difference in curvature between driving paths.

By setting this target driving path, as illustrated in FIG. 8, the curvature of the driving path of vehicle 100 (specifically, the maximum value of the curvature) becomes less than the curvature of the target driving path that traces the center of the traffic lane.

Figure 9:
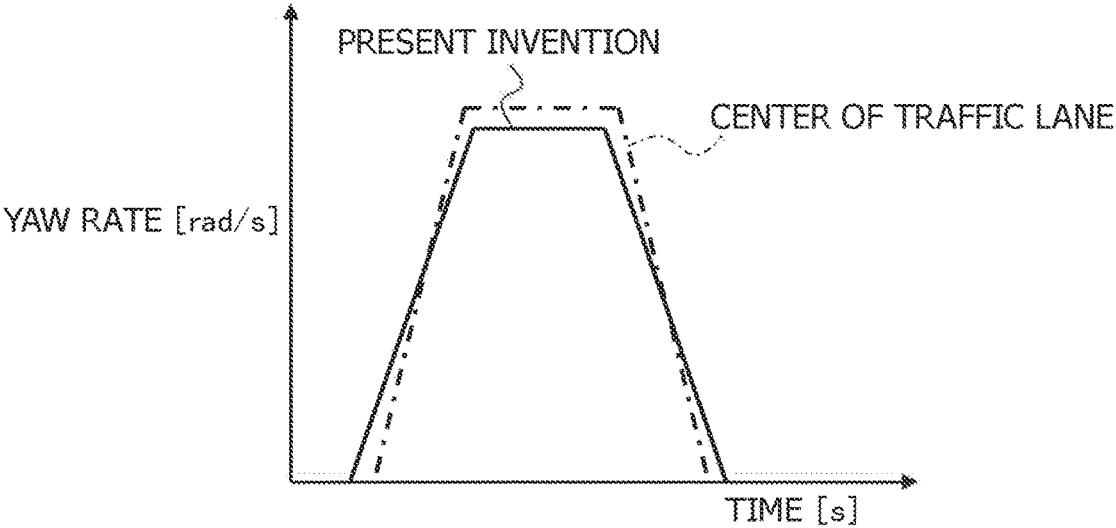
FIG. 9 illustrates the difference in yaw rate between the driving paths.
Figure 10:
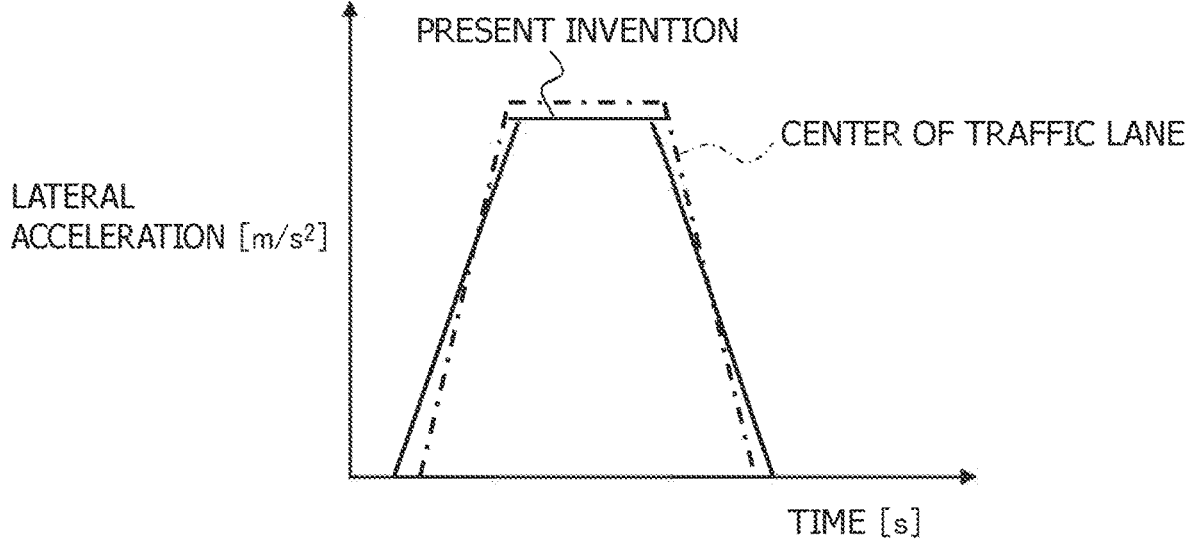
FIG. 10 illustrates the difference in lateral acceleration between the driving paths.
Figure 11:
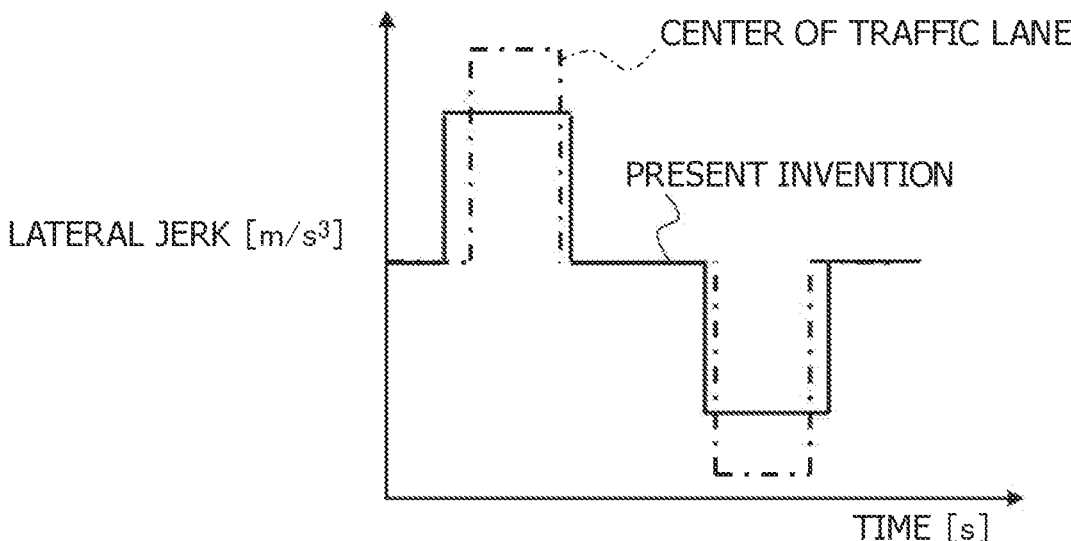
FIG. 11 illustrates the difference in lateral jerk between the driving paths.

If the curvature of the driving trajectory becomes small, as illustrated in FIG. 9, the yaw rate that occurs when vehicle 100 is running on the curve also becomes small. As illustrated in FIG. 10, the lateral acceleration that occurs when vehicle 100 is running on the curve also becomes small, and as illustrated in FIG. 11, the lateral jerk that occurs when vehicle 100 is running on the curve also becomes small.

Thus, setting a target driving path that reduces the lateral acceleration or the lateral jerk as much as possible within the specified driving area can improve ride quality and comfort of vehicle 100 more than setting the center of the traffic lane as the target driving path.

Figure 12:
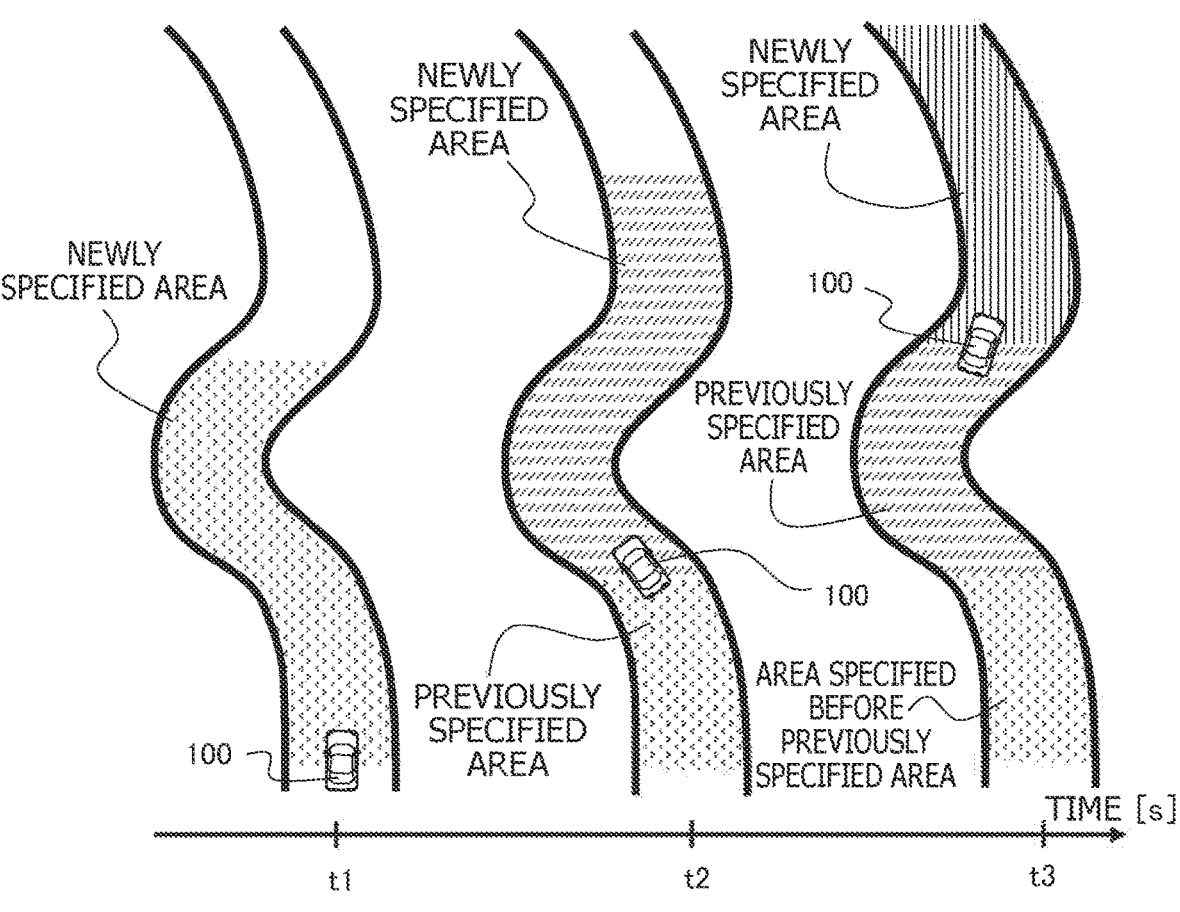
FIG. 12 illustrates target driving area update processing.

FIG. 12 illustrates how automated driving control unit 500 specifies a driving area to vehicle motion control unit 600, in other words, how automated driving control unit 500 gives information specifying a driving area to vehicle motion control unit 600.

First, at time t1, automated driving control unit 500 specifies a driving area (in other words, a first driving area) to vehicle motion control unit 600. Next, before vehicle 100 runs through the specified driving area, in other words, at time t2 at which vehicle 100 is still running in the previously instructed driving area, automated driving control unit 500 specifies the next driving area (in other words, a second driving area) to vehicle motion control unit 600.

Thus, the driving area specified by automated driving control unit 500 at time t2 (newly specified area at time t2 in FIG. 12) partly overlaps the driving area previously specified at time t1 (previously specified area at time t2 in FIG. 12).

In addition, after specifying the driving area at time t2, automated driving control unit 500 specifies the next driving area at time t3 (newly specified area at time t3 in FIG. 12). Thereafter, automated driving control unit 500 periodically repeats specifying a driving area in the same way.

The newly specified area in time t2 becomes the previously specified area at time t3, and the newly specified area at time t1 becomes the area specified before previously specified area at time t3.

After vehicle 100 runs in the previously instructed driving area for a predetermined time, automated driving control unit 500 specifies the next driving area to vehicle motion control unit 600.

In other words, after vehicle 100 runs in the previously instructed driving area for a predetermined time, vehicle motion control unit 600 acquires a driving area that partly overlaps the previously instructed driving area.

After vehicle 100 runs in the previously instructed driving area for a predetermined time, automated driving control unit 500 can specify the next driving area to vehicle motion control unit 600.

In addition, automated driving control unit 500 can calculate a driving area instruction timing based on the time and a driving area instruction timing based on the driving distance and can specify a new driving area at the earlier one of the timings to the vehicle motion control unit 600, for example.

Figure 13:
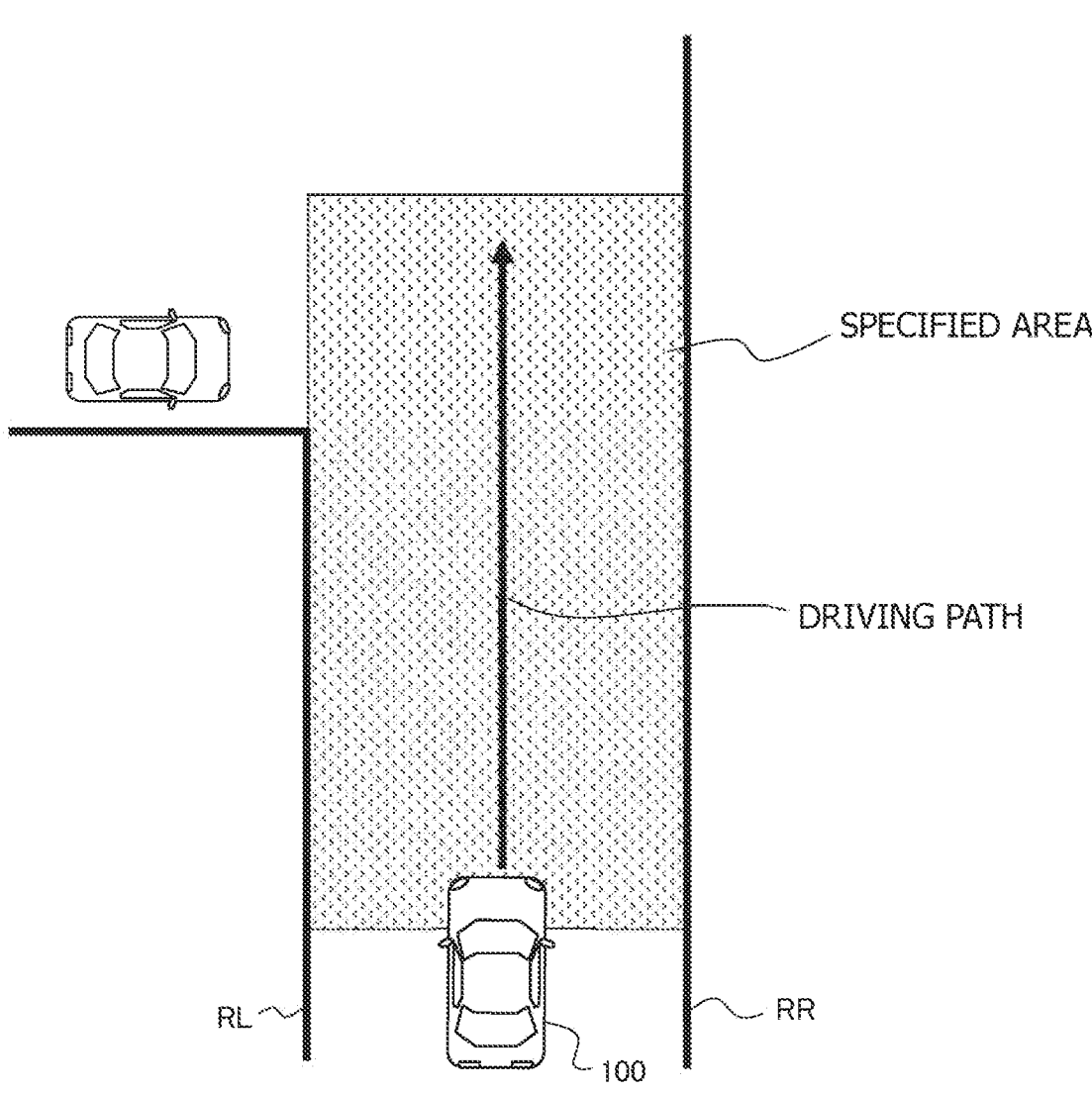
FIG. 13 illustrates a basic setting of a target driving area.

FIG. 13 illustrates how automated driving control unit 500 creates a basic driving area.

As illustrated in FIG. 13, automated driving control unit 500 sets, as a driving area, an area between right and left lane markers RL and RR of the road in front of vehicle 100 or an area between the right and left edges of the road in front of vehicle 100.

Figure 14:
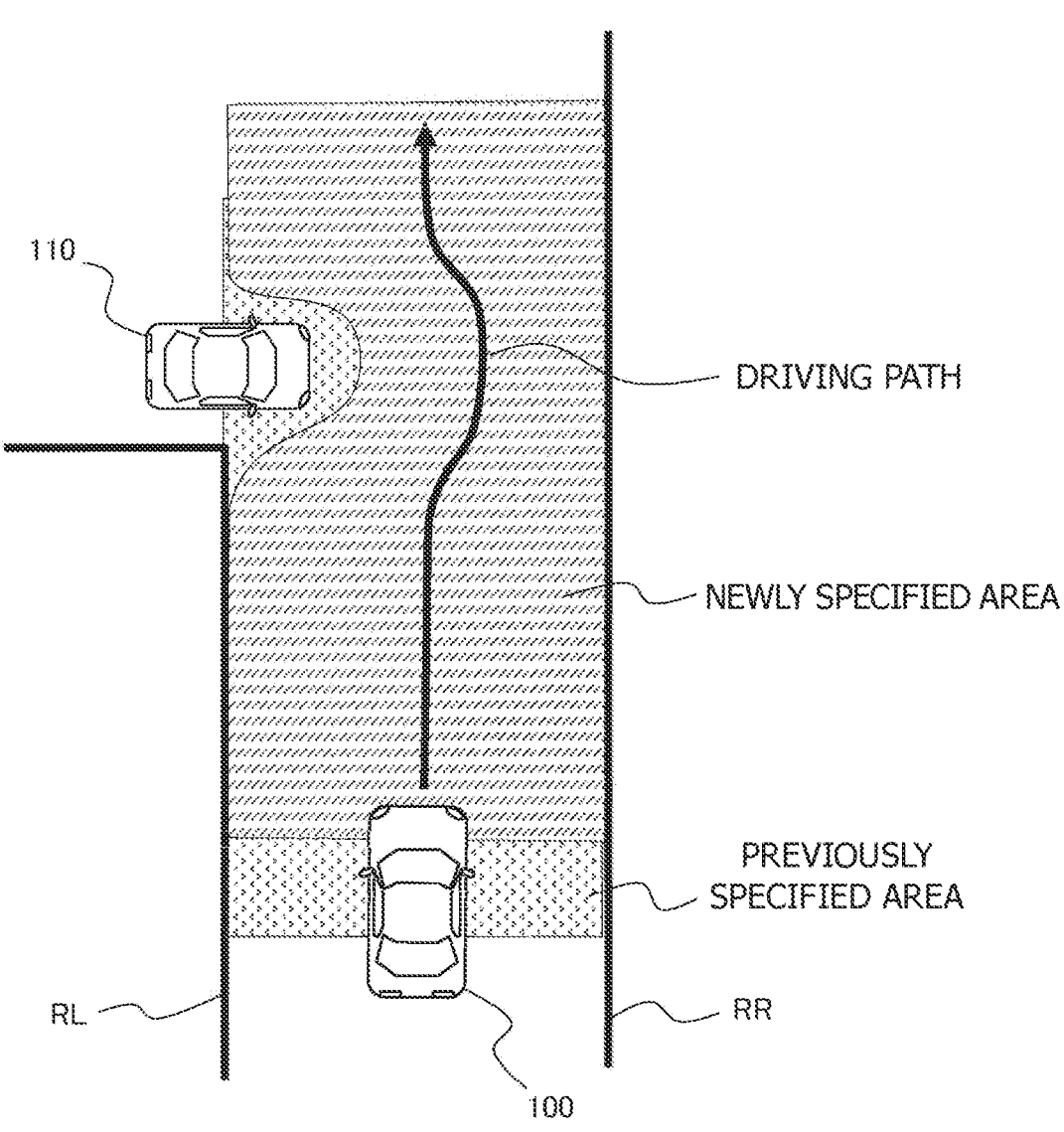
FIG. 14 illustrates a correlation between an object area and the target driving area.

FIG. 14 illustrates how automated driving control unit 500 creates a driving area when a normal driving area set between the right and left lane markers RL and RR includes an object.

When a normal driving area includes an object, automated driving control unit 500 instructs, as a driving area, an area that does not include this object, that is, an area obtained by removing the area of the object from the normal driving area.

In the example illustrated in FIG. 14, a vehicle 110 is entering the traffic lane (in other words, the normal driving area) on which vehicle 100 is running from a sideway ahead of vehicle 100.

In this case, automated driving control unit 500 specifies, as a driving area, an area obtained by removing an area including the vehicle 110 (that is, the object area) from the normal driving area to vehicle motion control unit 600.

In response, vehicle motion control unit 600 sets a target driving path within the driving area specified by automated driving control unit 500 and drives vehicle 100 on this path that avoids the vehicle 110.

When an object is moving, automated driving control unit 500 can change the size of the area to be removed from the normal driving area, depending on the moving direction and moving velocity of the object.

In addition, when the normal driving area includes an object, automated driving control unit 500 can specify information about an area obtained by removing the object area from the normal driving area and can specify information about the normal driving area and information about the object area (in other words, information about the area to be removed from the normal driving area) to vehicle motion control unit 600.

Figure 15:
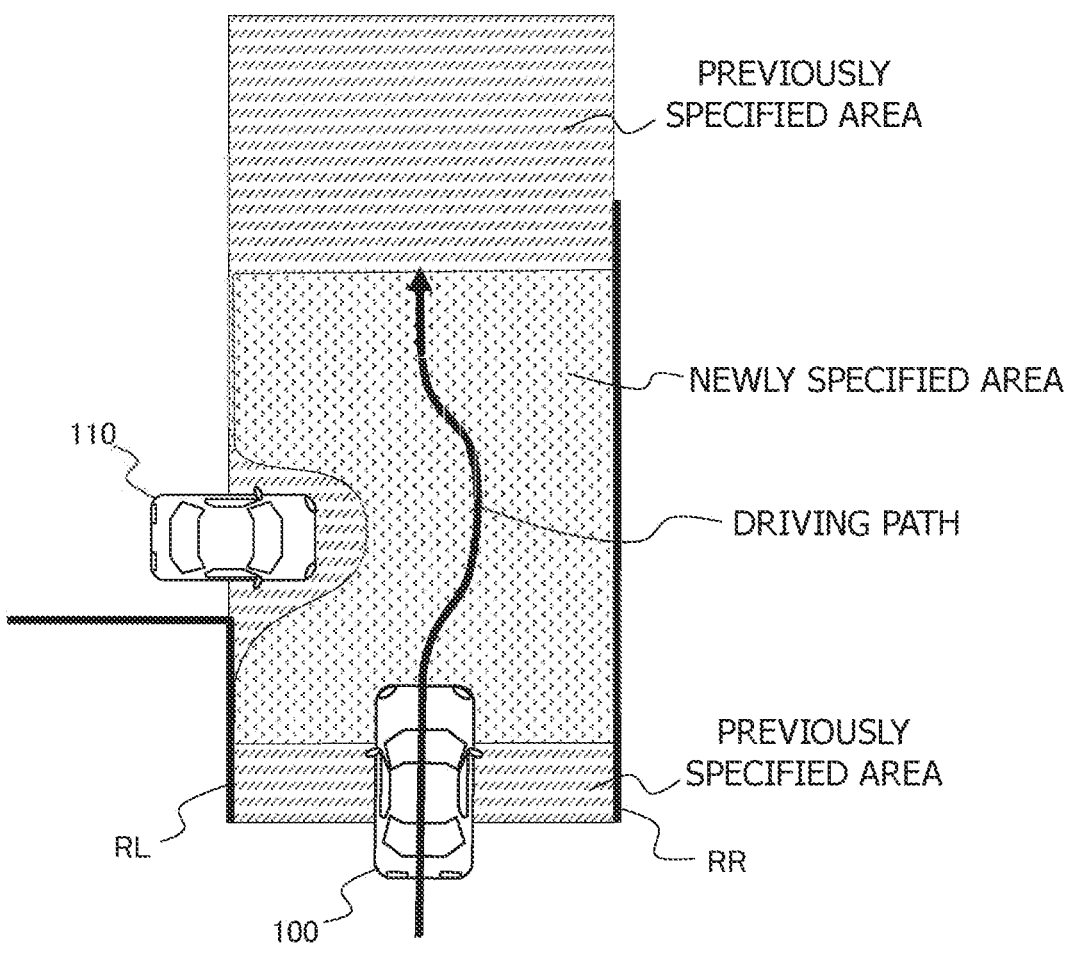
FIG. 15 illustrates updating of the target driving area when the situation of the object changes.
Figure 16:
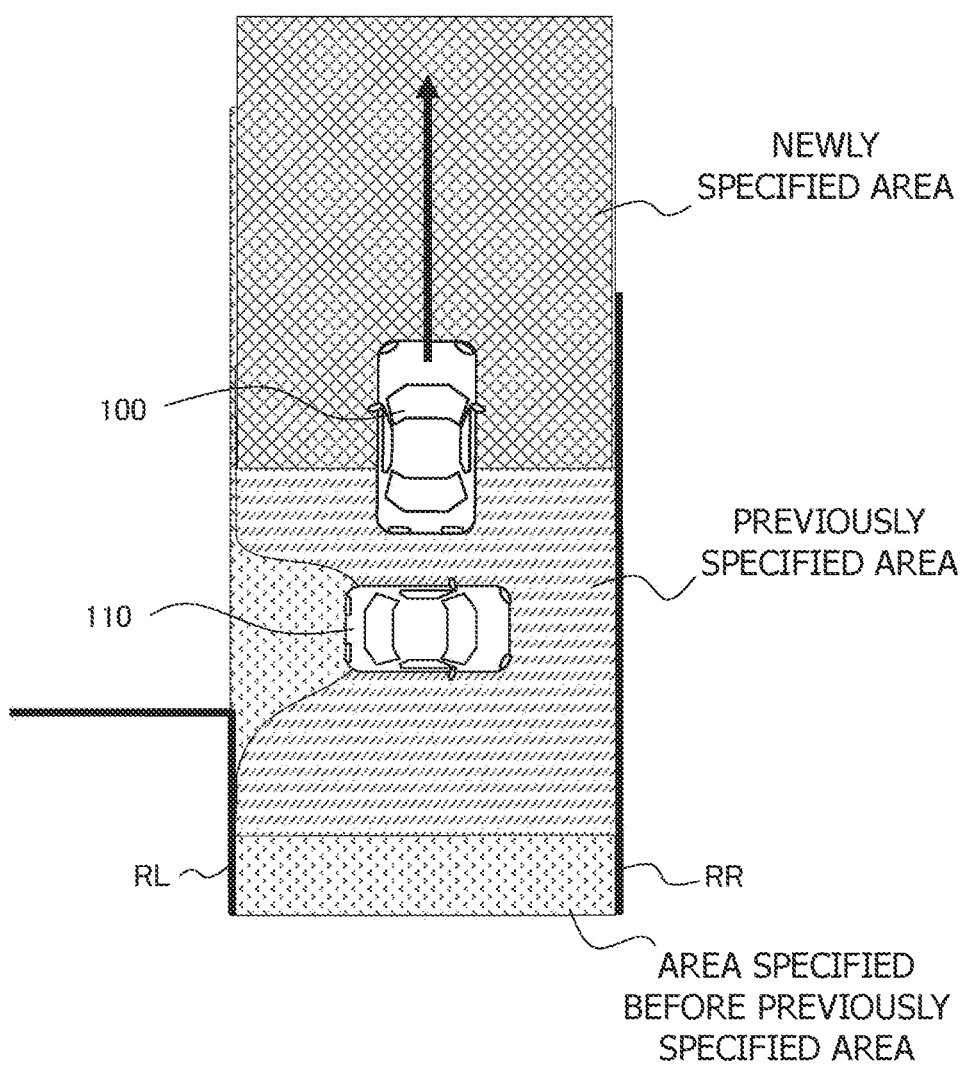
FIG. 16 illustrates updating of the target driving area after the situation of the object has changed.

FIGS. 15 and 16 each illustrate how automated driving control unit 500 creates and specifies a driving area when a predetermined situational change occurs in object information.

The following description assumes that vehicle 110 suddenly enters the traffic lane in which vehicle 100 is running from the sideway as illustrated in FIG. 15 after automated driving control unit 500 determines that there is no object within the normal driving area and specifies the normal driving area to vehicle motion control unit 600 as the final target driving area as illustrated in FIG. 13.

If this case, as illustrated in FIG. 15, automated driving control unit 500 quickly specifies a new driving area, that is, a driving area obtained by removing the object area including vehicle 110 from the traffic lane in which vehicle 100 is running, to vehicle motion control unit 600, without waiting for the reference driving area instruction timing. In addition, automated driving control unit 500 instructs vehicle motion control unit 600 to set a target driving path that avoids vehicle 110.

When specifying a new driving area based on a sudden situational change as described above, automated driving control unit 500 can specify a driving area shorter than the normal driving area to vehicle motion control unit 600.

After specifying the shorter driving area based on the sudden situational change, automated driving control unit 500 specifies a new driving area to vehicle motion control unit 600 as illustrated in FIG. 16, before vehicle 100 runs through the specified shorter driving area.

The examples illustrated in FIGS. 15 and 16 each illustrate a case in which a situational change occurs in object information. Similarly, if a situational change occurs in road surface information and this situational change has not been reflected in the previously specified driving area, automated driving control unit 500 can also specify a new driving area on which the situational change has been reflected, regardless of the time that has elapsed since the previously specified driving area (or regardless of the driving distance).

Figure 17:
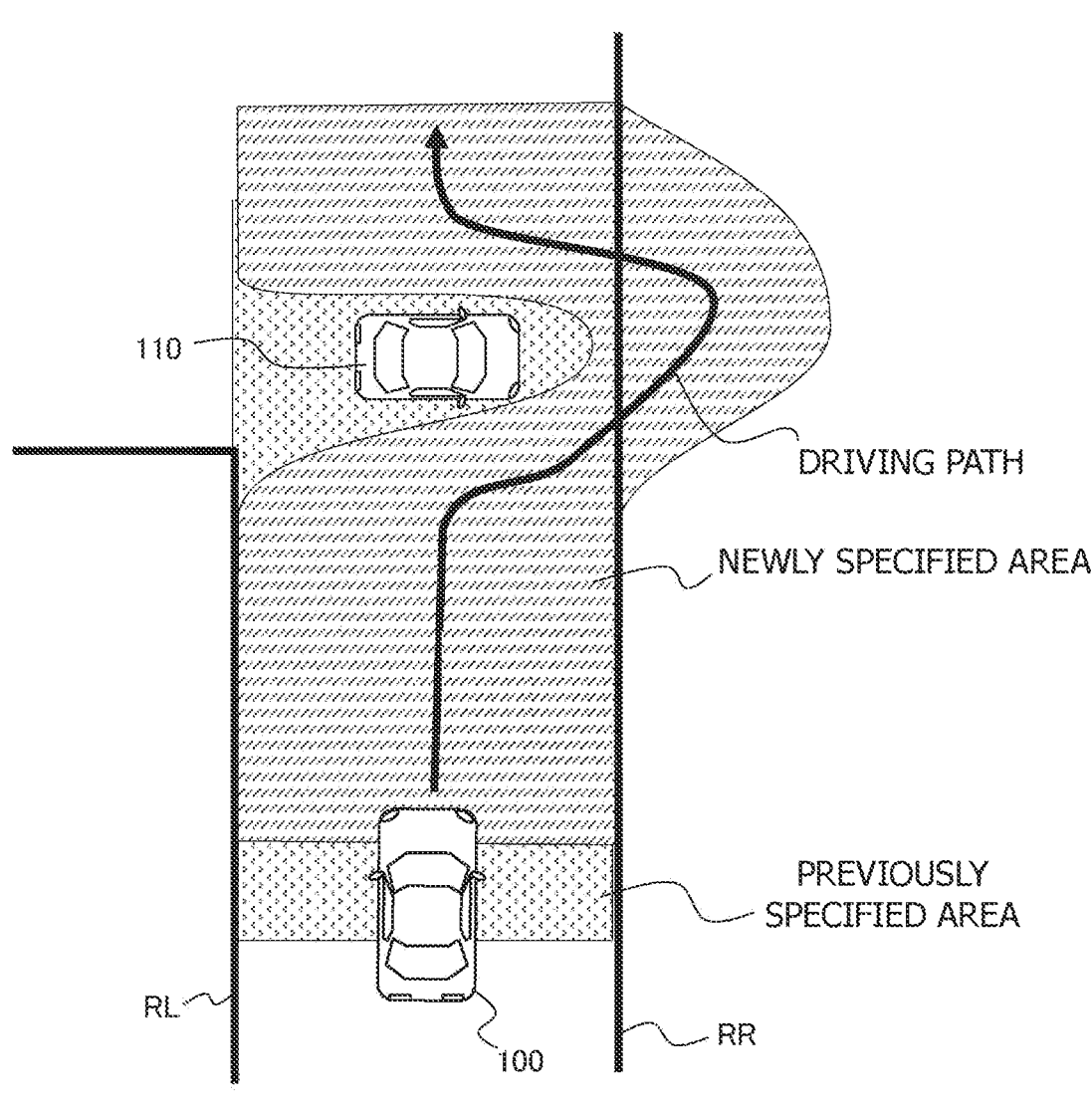
FIG. 17 illustrates setting of a target driving area extending out from a traffic lane.

FIG. 17 illustrates a case in which automated driving control unit 500 specifies a driving area including an area extending out to the right or left from a normal driving area.

The example illustrated in FIG. 17 is a case in which vehicle 110 enters the traffic lane in which vehicle 100 is running and it is difficult for vehicle 100 to avoid vehicle 110 within the same traffic lane.

In this case, automated driving control unit 500 specifies a driving area including a neighboring traffic lane (specifically, a passing traffic lane, an oncoming traffic lane, or the like) so that vehicle 100 can run beyond the current traffic lane to avoid vehicle 110.

That is, when the current traffic lane includes an object such as vehicle 110, and it is difficult for vehicle 100 to avoid the object within the current traffic lane, automated driving control unit 500 determines whether certain conditions are met, e.g., whether no vehicle is running in a neighboring traffic lane. If these certain conditions are met, automated driving control unit 500 specifies a driving area extending out into the neighboring traffic lane from the current traffic lane to vehicle motion control unit 600.

By setting a target driving path within the driving area specified by automated driving control unit 500, vehicle motion control unit 600 can drive vehicle 100 on the driving path that avoids the object within the current traffic lane.

When no driving area extending out into a neighboring traffic lane can be specified, e.g., when there is no neighboring traffic lane or when another vehicle is running in a neighboring traffic lane, automated driving control unit 500 outputs a brake command for stopping vehicle 100 before the object within the traffic lane to vehicle motion control unit 600.

Figure 18:
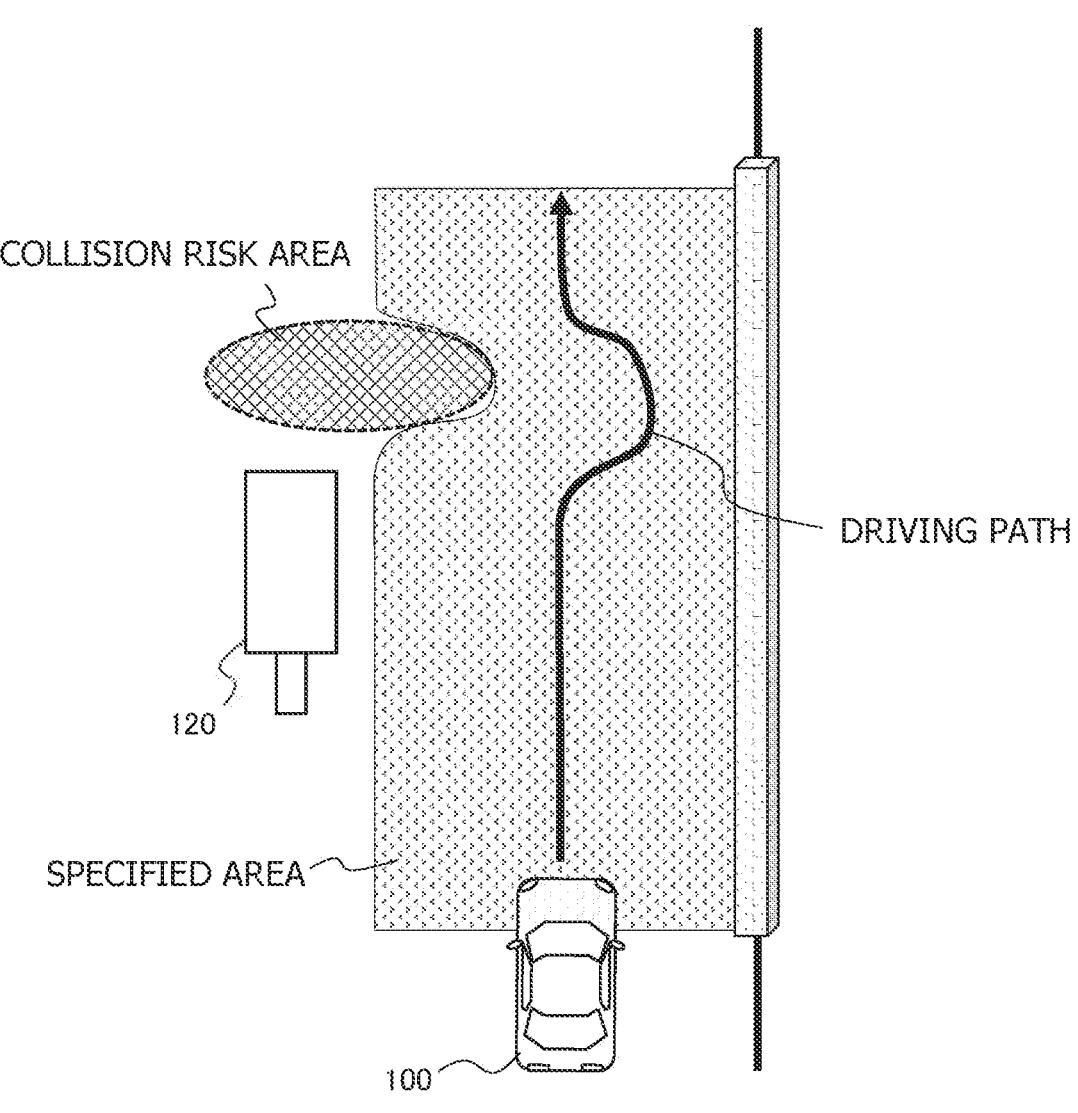
FIG. 18 illustrates a correlation between a collision risk area (specifically, a sudden appearance alert area) and a target driving area.

FIG. 18 illustrates a mode of a case in which automated driving control unit 500 specifies a driving area obtained by removing a collision risk area from a normal driving area. Specifically, FIG. 18 illustrates a case in which a sudden appearance alert area is set as a collision risk area.

The example illustrated in FIG. 18 is a situation in which there is a signboard 120 on the left side of a normal driving area (in other words, the current traffic lane) and there is a concern that, for example, a pedestrian may suddenly appear in the current traffic lane from a blind spot behind signboard 120.

In this case, automated driving control unit 500 sets a collision risk area (in other words, a sudden appearance alert area) that extends from the blind spot behind signboard 120 into the current traffic lane and specifies an area obtained by removing the collision risk area from the normal driving area to vehicle motion control unit 600 as the driving area.

In this way, because vehicle motion control unit 600 drives vehicle 100 on the path that avoids the collision risk area (specifically, the sudden appearance alert area), the driving safety of vehicle 100 is improved.

Figure 19:
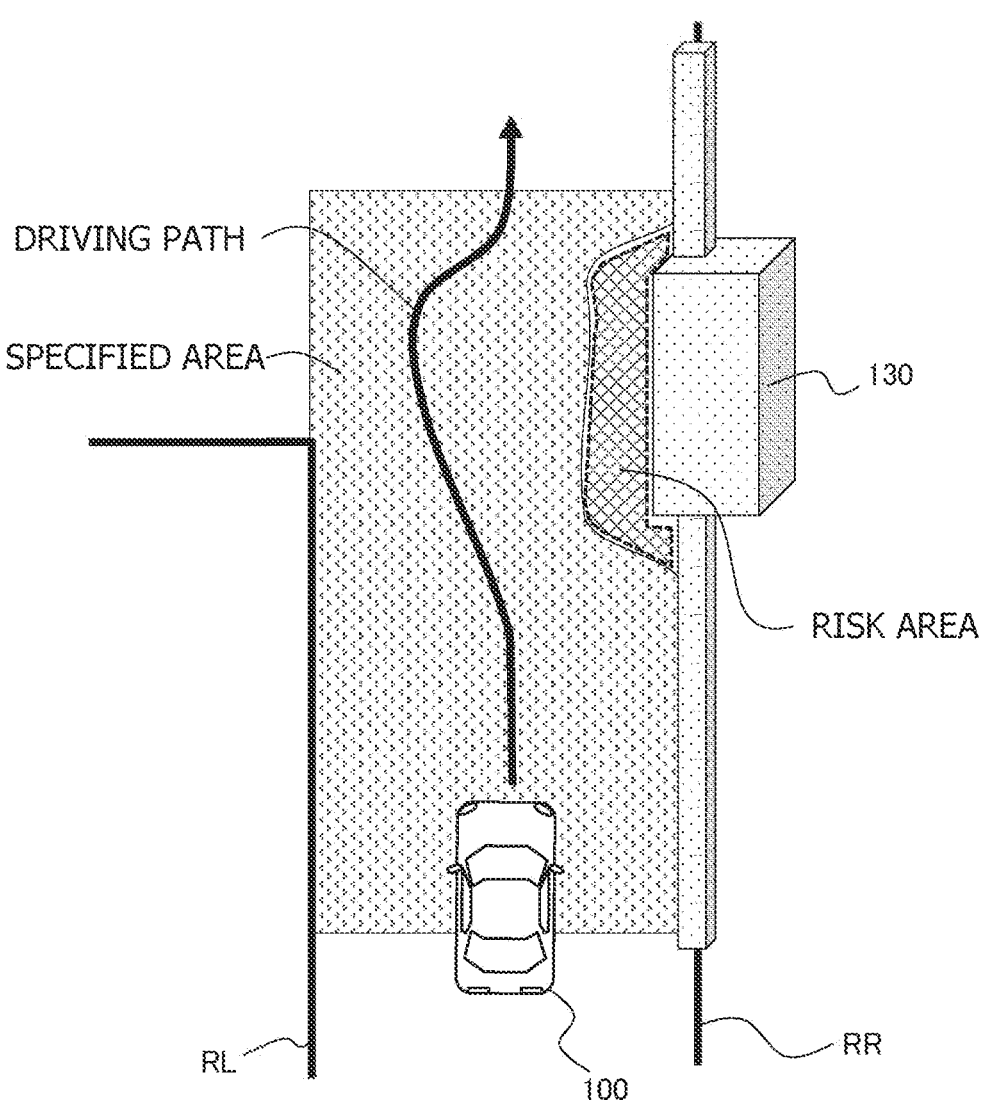
FIG. 19 illustrates a correlation between a collision risk area (specifically, an object at a road edge) and a target driving area.

FIG. 19 illustrates a mode of a case in which automated driving control unit 500 specifies a driving area obtained by removing a collision risk area from a normal driving area. Specifically, FIG. 18 illustrates a case in which an area near an object at a road edge is set as a collision risk area.

The example illustrated in FIG. 19 is a case in which there is a high wall 130 on the right edge of the road, and wall 130 does not directly disturb driving of vehicle 100.

In this case, automated driving control unit 500 can set an area near wall 130 as a collision risk area such that vehicle 100 will not run near wall 130 and can specify a driving area that avoids the area near wall 130 to vehicle motion control unit 600.

In this way, vehicle motion control unit 600 can drive vehicle 100 on a path that avoids an area near an object such as wall 130.

Figure 20:
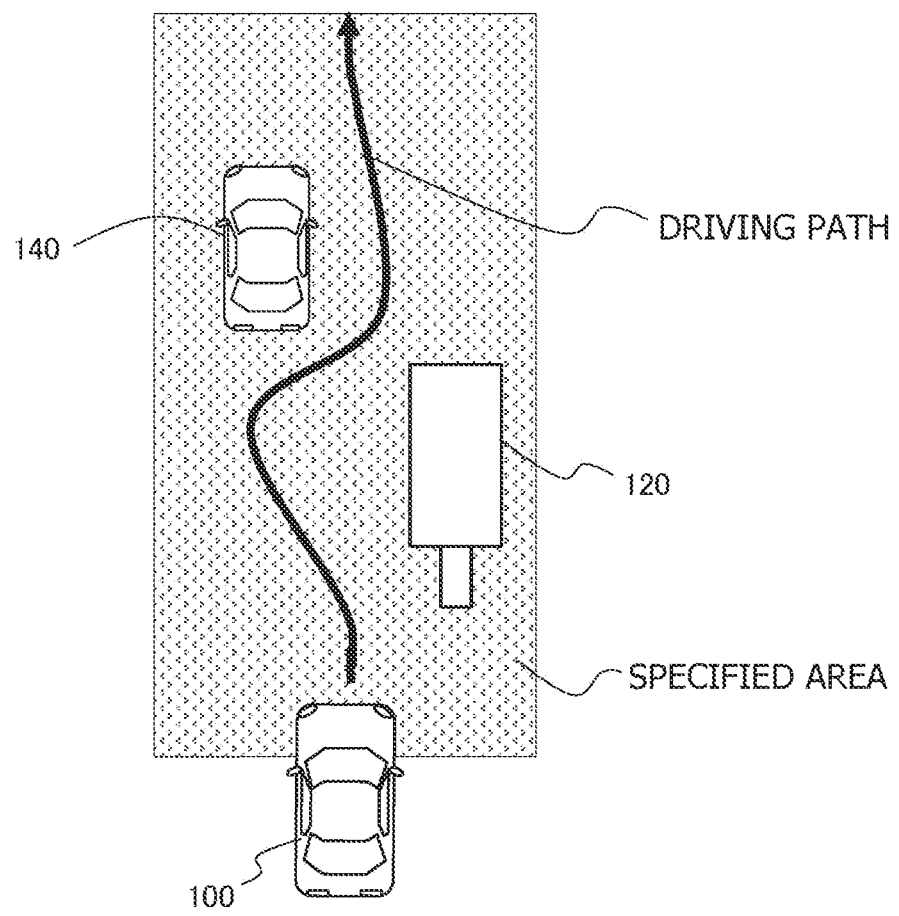
FIG. 20 illustrates setting of a driving path when a target driving area includes a plurality of objects.
Figure 21:
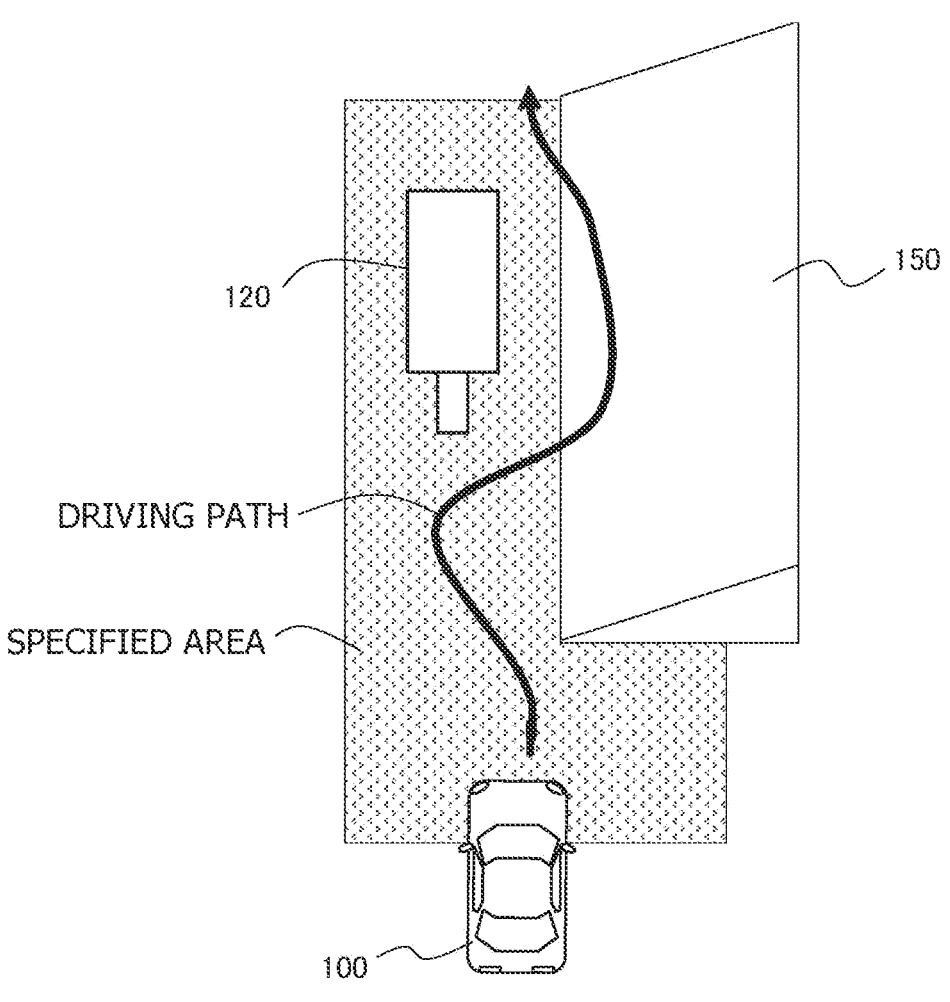
FIG. 21 illustrates setting of a driving path when a target driving area includes an object and cant of a road surface.
Figure 22:
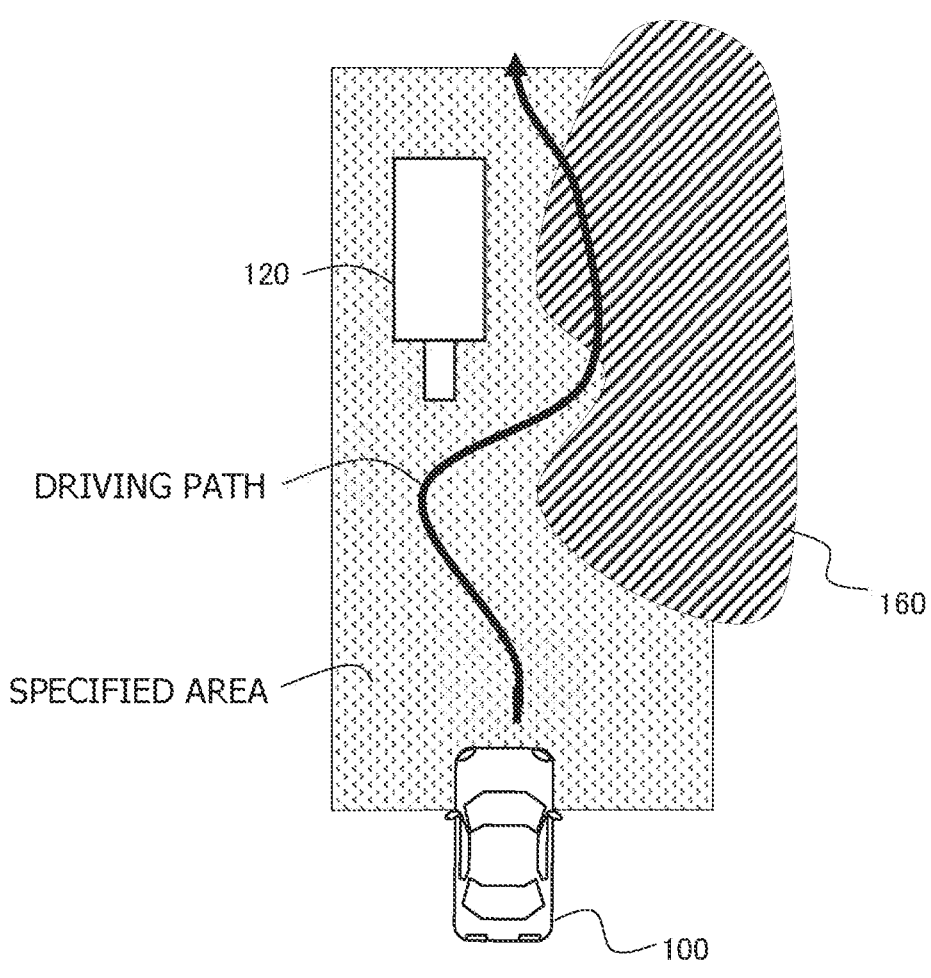
FIG. 22 illustrates setting of a driving path when a target driving area includes an object and a low μ road surface.

FIGS. 20 to 22 each illustrate an example of a case in which a target command that automated driving control unit 500 specifies to vehicle motion control unit 600 includes, in addition to an instruction about a driving area, information about a road surface and/or information about an object in front of vehicle 100.

FIG. 20 illustrates an example of a case in which a driving area includes a plurality of objects, more specifically, a case in which the driving area in front of vehicle 100 includes a signboard 120 and a stopped vehicle 140.

In this situation, automated driving control unit 500 specifies a driving area to vehicle motion control unit 600 and specifies, as object information, information about the location and the size of signboard 120 and information about the location and the size of stopped vehicle 140.

When the object information is specified along with the driving area, vehicle motion control unit 600 sets a target driving path within the specified driving area, the target driving path that avoids objects such as signboard 120 and stopped vehicle 140 located within the driving area.

FIG. 21 illustrates an example of a case in which the driving area includes signboard 120 as an object and a part of a cant 150 of a road surface.

Cant 150 of a road surface is a slope of a road surface in the lateral direction.

In this case, automated driving control unit 500 specifies a driving area and also specifies information about the location and the size of signboard 120 as object information and information about the area of cant 150 of the road surface, the angle of the slope, and the direction of the slope as road surface information to vehicle motion control unit 600.

When the object information and the road surface information are specified along with the driving area, vehicle motion control unit 600 sets a target driving path in view of the object information and the road surface information within the specified driving area.

In this case, vehicle motion control unit 600 sets a target driving path that avoids signboard 120 within the driving area.

In addition, if vehicle 100 can run while avoiding cant 150 of the road surface, vehicle motion control unit 600 sets a target driving path that avoids the area of cant 150 of the road surface. If it is difficult for vehicle 100 to run while avoiding cant 150 of the road surface, vehicle motion control unit 600 selects, from among the paths that pass through cant 150 of the road surface, one that ensures good ride quality, as the target driving path.

FIG. 22 illustrates an example of a case in which the driving area includes signboard 120 as an object and a part of a road surface 160 having a low friction coefficient μ (which will hereinafter be referred to as a low μ road surface 160).

Examples of low μ road surface 160 include a road surface with a puddle, a road surface covered with ice or snow, a road surface with compacted snow, and a road surface with sand or fallen leaves.

In this case, automated driving control unit 500 specifies a driving area to vehicle motion control unit 600 and also specifies information about the location and the size of signboard 120 as object information and information about the area of low μ road surface 160 as road surface information, for example.

When the object information and the road surface information are specified along with the driving area, vehicle motion control unit 600 sets a target driving path in view of the object information and the road surface information within the specified driving area.

In this case, vehicle motion control unit 600 sets a target driving path that avoids signboard 120 within the driving area.

In addition, if vehicle 100 can run while avoiding low μ road surface 160, vehicle motion control unit 600 sets a target driving path that avoids the area of low μ road surface 160. If it is difficult for vehicle 100 to run while avoiding low μ road surface 160, vehicle motion control unit 600 selects, from among the paths that pass through low μ road surface 160, one that ensures good ride quality, as the target driving path.

Automated driving control unit 500 can specify not only a driving area (along with road surface information and object information) but also a recommended path, which is a recommended driving path within the driving area, to vehicle motion control unit 600.

If vehicle motion control unit 600 determines that vehicle 100 can run on the specified recommended path and that the recommended path does not have any factor that deteriorates the ride quality or comfort or that causes motion sickness or the like, vehicle motion control unit 600 outputs a control command for driving vehicle 100 on the recommended path.

However, if vehicle motion control unit 600 determines that vehicle 100 cannot run on the specified recommended path and/or that the recommended path has a factor that deteriorates the ride quality or comfort or that causes motion sickness or the like, vehicle motion control unit 600 calculates a target driving path different from the recommended path by itself.

That is, if vehicle motion control unit 600 determines that vehicle 100 cannot run on the recommended path specified by automated driving control unit 500, vehicle motion control unit 600 calculates another target driving path that vehicle 100 can follow, in place of the recommended path.

In addition, if vehicle motion control unit 600 determines that there is a driving path that achieves better ride quality or the like than the recommended path specified by automated driving control unit 500, vehicle motion control unit 600 calculates a target driving path that achieves better ride quality or the like, in place of the recommended path.

Next, vehicle motion control unit 600 outputs a control command for driving vehicle 100 on the target driving path it itself calculated.

Figure 23:
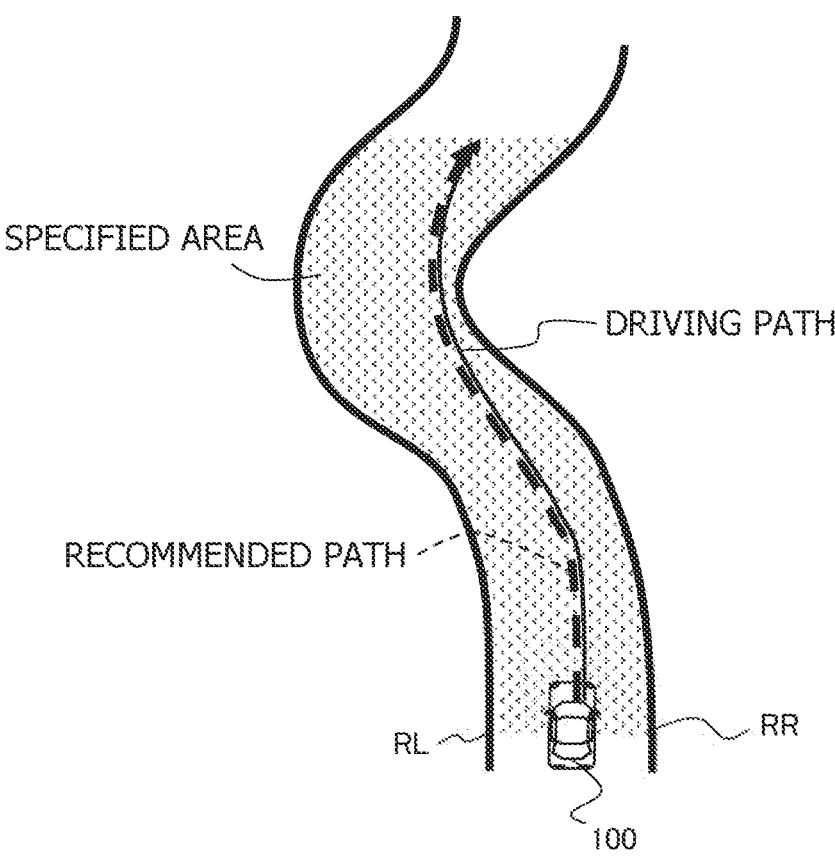
FIG. 23 illustrates a case in which a recommended path specified by a recognition and determination unit is set as a driving path.
Figure 24:
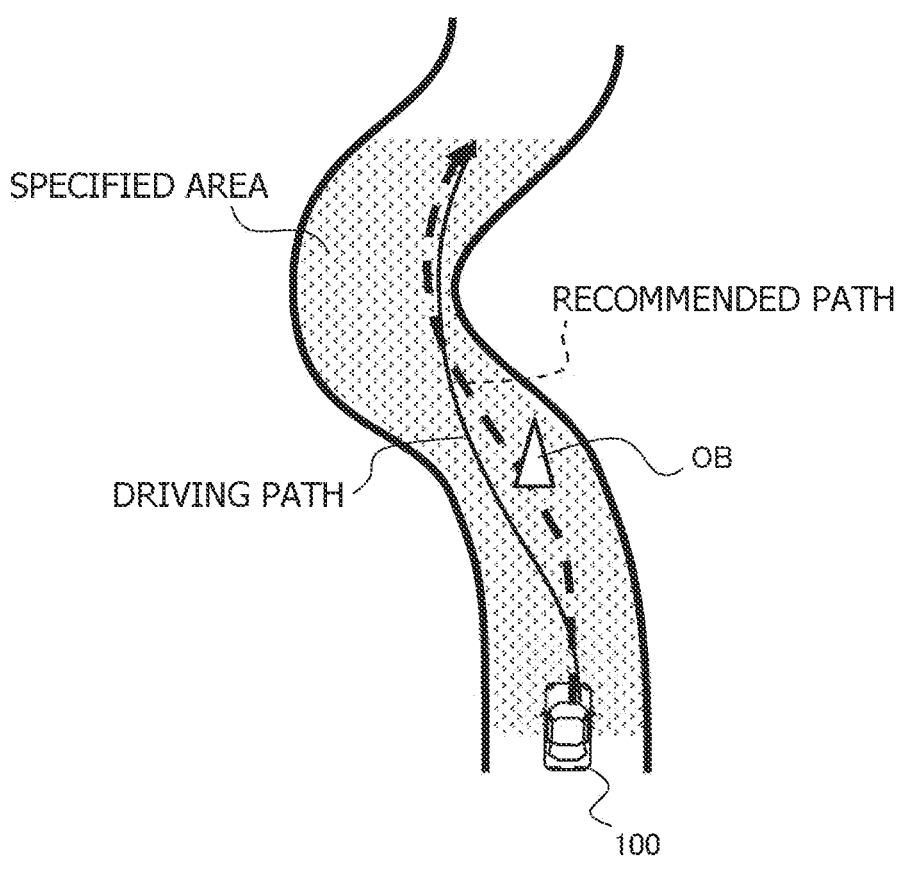
FIG. 24 illustrates a driving path when a recommended path specified by the recognition and determination unit includes an object.
Figure 25:
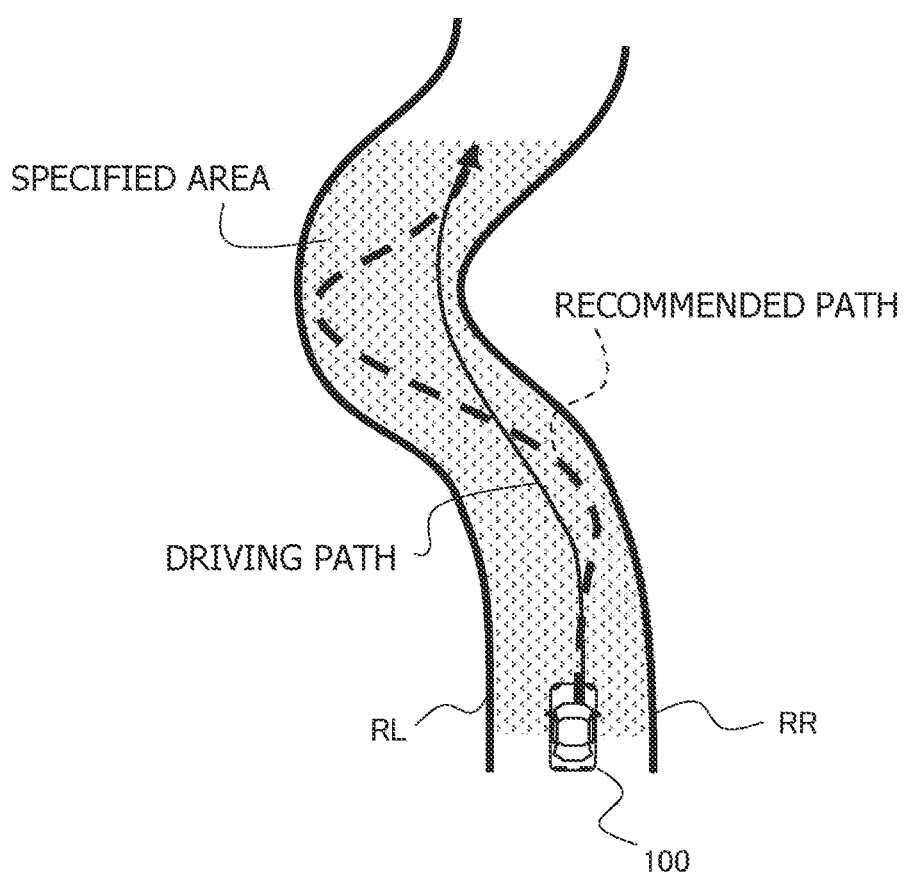

FIGS. 23 to 25 each illustrate a target driving path set by vehicle motion control unit 600 when automated driving control unit 500 specifies a recommended path.

FIG. 23 illustrates a recommended path specified by automated driving control unit 500 and a target driving path. In FIG. 23, vehicle 100 can run on the recommended path, and the recommended path has no factor that deteriorates the ride quality or the like.

In this case, vehicle motion control unit 600 sets the recommended path as the target driving path and outputs a control command for driving vehicle 100 on this target driving path to actuator unit 700.

FIG. 24 illustrates a recommended path specified by automated driving control unit 500 and an actual driving path. In FIG. 24, the recommended path includes an object such as a fallen object, and vehicle 100 cannot run on the recommended path.

In this case, based on the driving area, recommended path, and object information specified by automated driving control unit 500, vehicle motion control unit 600 determines that there is an object on the recommended path and sets, in place of the recommended path, a target driving path on which vehicle 100 runs while avoiding the object within the specified driving area.

FIG. 25 illustrates a case in which a recommended path specified by automated driving control unit 500 has a factor that deteriorates the ride quality or the like.

In this case, vehicle motion control unit 600 estimates the lateral acceleration or lateral jerk that occurs when vehicle 100 runs on the recommended path and sets, as the target driving path, a path that can make the lateral acceleration or the lateral jerk that occurs in vehicle 100 less than the lateral acceleration or the lateral jerk that would occur when vehicle 100 runs on the recommended path.

Vehicle motion control unit 600 can set a linear driving path within a driving area specified by automated driving control unit 500. In addition to that, vehicle motion control unit 600 can set driving paths as areas, each of which has a probability that vehicle 100 runs. This probability will hereinafter be referred to as driving probability. Vehicle motion control unit 600 can output a control command to actuator unit 700 such that vehicle 100 will pass through an area having a higher driving probability; in other words, vehicle 100 will pass through a location closer to a location at which an extreme probability is indicated.

FIGS. 26 to 29 each illustrate setting of a target driving path as an area having a probability that vehicle 100 runs.

Figure 26:
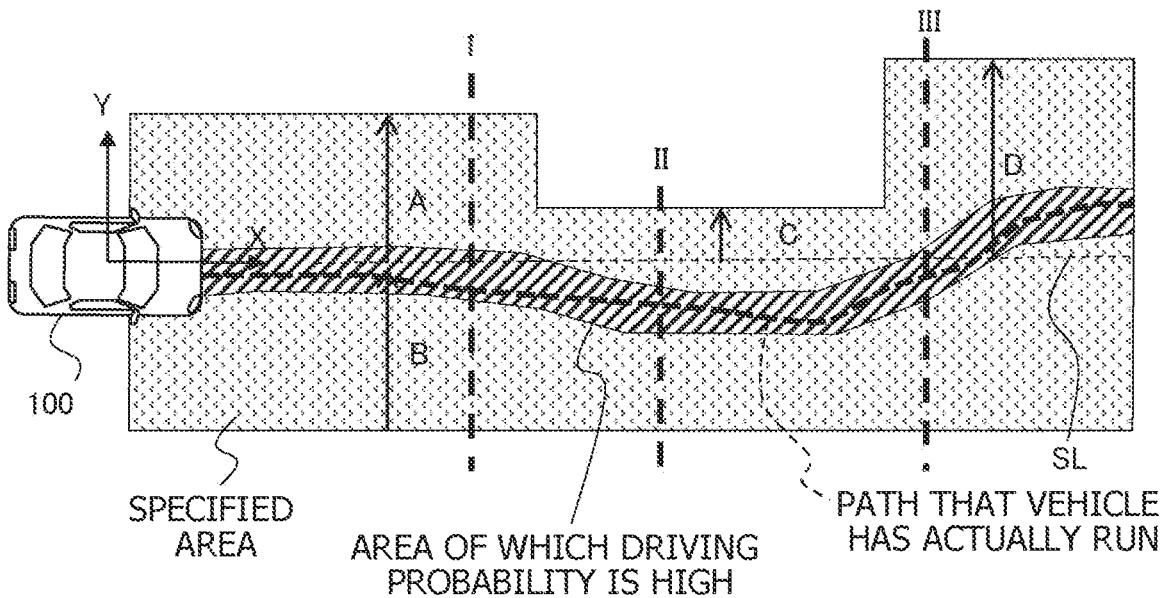
FIG. 26 illustrates an area having a driving probability of a vehicle as a target driving path.

FIG. 26 illustrates a mode of a driving area specified by automated driving control unit 500, a path that vehicle 100 has actually run, and an area at which driving probability is high.

Figure 27:
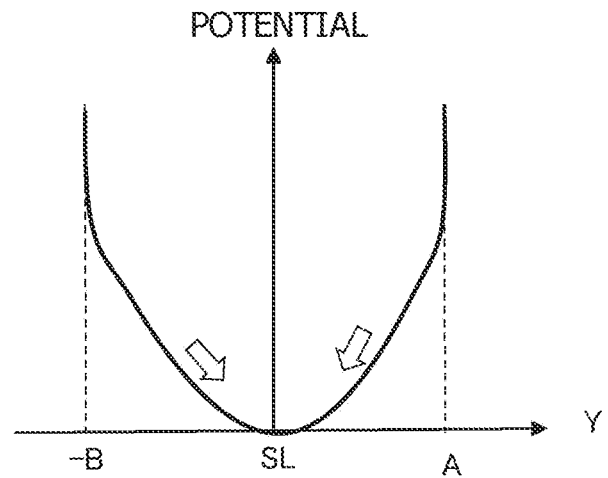
FIG. 27 is a diagram illustrating a setting state of a driving probability at site I in FIG. 26.
Figure 28:
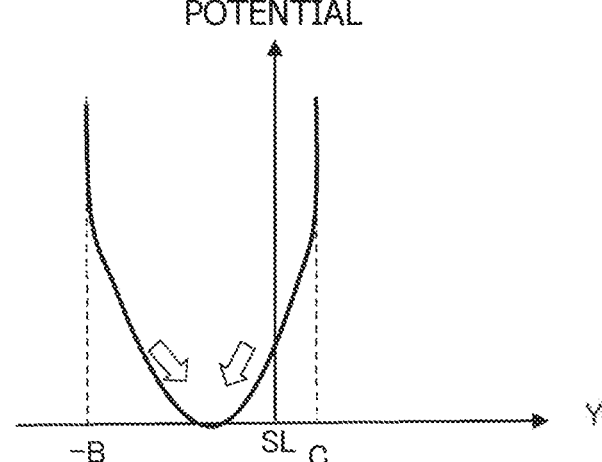
FIG. 28 is a diagram illustrating a setting state of a driving probability at site II in FIG. 26.
Figure 29:
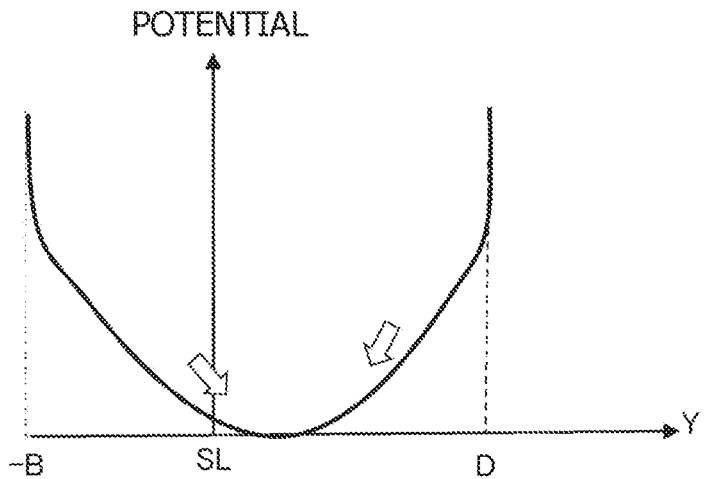
FIG. 29 is a diagram illustrating a setting state of a driving probability at site III in FIG. 26.

In addition, FIGS. 27 to 29 illustrate setting of the probability that vehicle 100 runs on the right or left side at sites I, II, and III (see FIG. 26), each of which is differently distanced from the current location of vehicle 100, in the driving area specified by automated driving control unit 500.

Vehicle motion control unit 600 sets the driving probability, based on the driving area specified by automated driving control unit 500 in view of ride quality and comfort of vehicle 100, motion sickness, etc.

In FIGS. 27 to 29, a line extending in the longitudinal direction of vehicle 100 at the current location of vehicle 100 is set as a standard line SL, and the distance to the right edge of the driving area and the distance to the left edge of the driving area from reference line SL are used to represent the lateral location of vehicle 100 at each of sites I to III.

As illustrated in FIG. 26, the distance from reference line SL to the left edge of the driving area at site I will be denoted as a distance A, and the distance from reference line SL to the left edge of the driving area at site II will be denoted as a distance C. In addition, the distance from reference line SL to the left edge of the driving area at site III will be denoted as a distance D.

In the example illustrated in FIG. 26, distance C<distance A<distance D. In addition, at sites I to III, the distance from reference line SL to the right edge of the driving area will be denoted as a distance B, and distance A=distance B.

Since distance A=distance B, reference line SL is located in the center of the driving area at site I.

As illustrated in FIG. 27, vehicle motion control unit 600 sets the driving probability of vehicle 100 such that the extreme value is located at reference line SL (that is, at the center of the driving area), that is, such that vehicle 100 runs as close as possible to reference line SL at site I.

In contrast, at site II, distance C from reference line SL to the left edge of the driving area is shorter than distance B from reference line SL to the right edge of the driving area. Thus, it is preferable that vehicle 100 run on a path a little to the right of reference line SL.

Thus, as illustrated in FIG. 28, vehicle motion control unit 600 sets the driving probability of vehicle 100 such that the extreme value is located a little to the right of reference line SL, that is, such that vehicle 100 runs on a path a little to the right of reference line SL at site II.

At site III, distance D from reference line SL to the left edge of the driving area is longer than distance B from reference line SL to the left edge of the driving area. Thus, it is preferable that vehicle 100 run on a path a little to the left of reference line SL.

Thus, as illustrated in FIG. 29, vehicle motion control unit 600 sets the driving probability of vehicle 100 such that the extreme value is located a little to the left of reference line SL, that is, such that vehicle 100 runs on a path a little to the left of reference line SL at site III.

While vehicle motion control unit 600 basically performs the probability setting such that vehicle 100 runs on the center of the driving area, vehicle motion control unit 600 sets the location of the extreme value of the probability in view of ride quality or the like of vehicle 100.

Vehicle control system 200 is not limited to the configuration illustrated in FIG. 1, that is, to the configuration including automated driving control unit 500 having a function as the recognition and determination unit and vehicle motion control unit 600 having a function as the control unit that outputs a control command to actuator unit 700 based on information specifying a driving area.

For example, vehicle control system 200 may include an integrated control unit that has a function as the recognition and determination unit and a function as the control unit, in place of automated driving control unit 500 and vehicle motion control unit 600 illustrated in FIG. 1.

Figure 30:
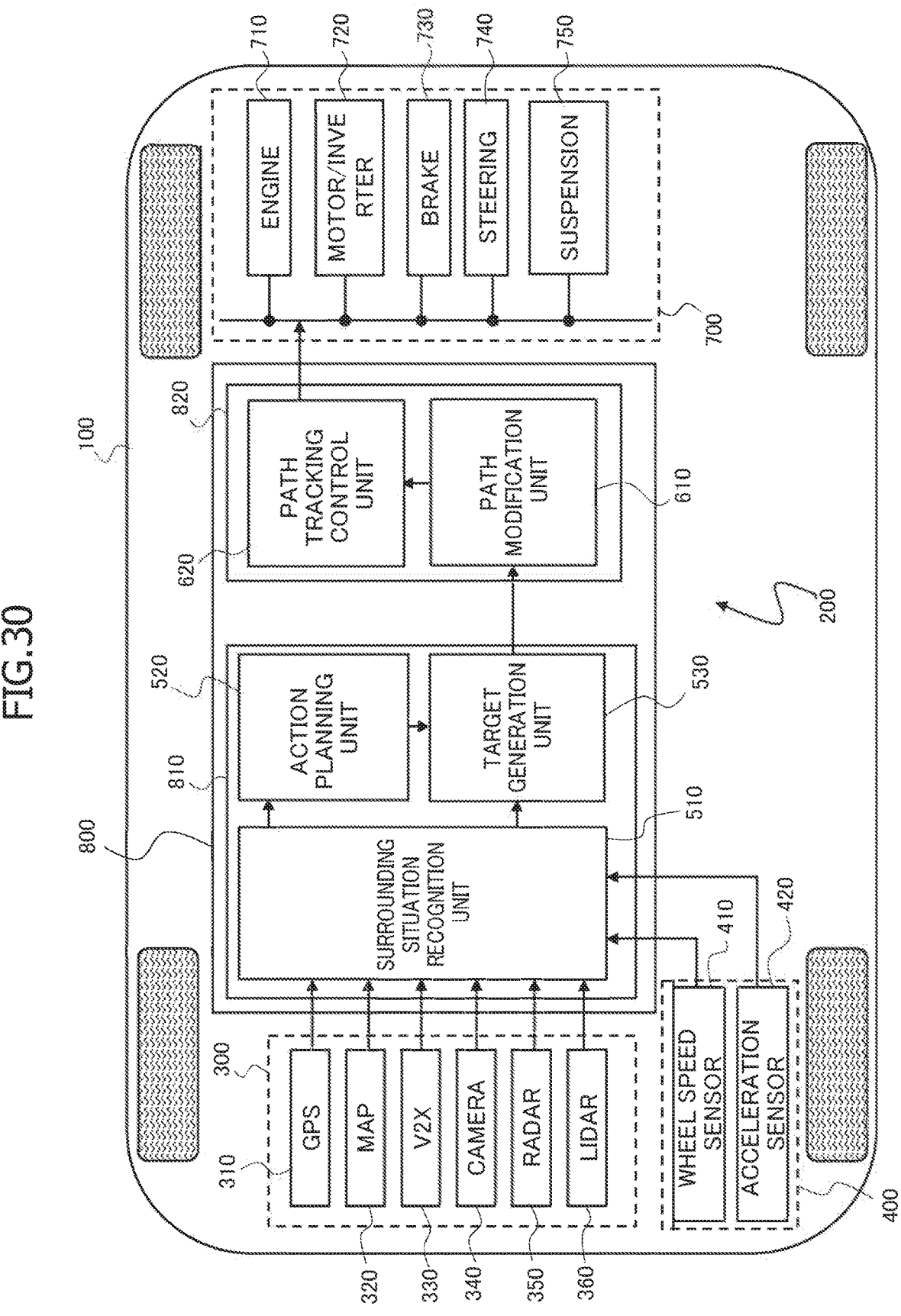
FIG. 30 is a block diagram of a vehicle control system including a single control unit on which two microcomputers are mounted.

Vehicle control system 200 illustrated in FIG. 30 includes an integrated control unit 800 having a function as the recognition and determination unit and a function as the control unit, in place of automated driving control unit 500 and vehicle motion control unit 600.

Like elements between FIGS. 1 and 30 are denoted by like reference numerals, and detailed description thereof will be omitted.

Integrated control unit 800 includes a first microcomputer 810 and a second microcomputer 820 in a single housing.

First microcomputer 810 has the recognition and determination unit as a software function, and second microcomputer 820 has, as a software function, the control unit that outputs a control command to actuator unit 700 based on information about a driving area specified by first microcomputer 810.

In FIG. 30, first microcomputer 810 has the functions of surrounding situation recognition unit 510, action planning unit 520, and target generation unit 530 illustrated in FIG. 1, that is, has the recognition and determination unit as a software function.

In addition, second microcomputer 820 has the functions of path modification unit 610 and path tracking control unit 620 illustrated in FIG. 1, that is, has the control unit as a software function.

First microcomputer 810 sets a driving area by performing recognition and determination based on information from external information recognition unit 300 and specifies the driving area to second microcomputer 820.

Second microcomputer 820 outputs, to actuator unit 700, a control command for driving vehicle 100 at a velocity and on a driving path that are based on specifications relating to driving of vehicle 100 within the driving area acquired from the first microcomputer 810.

Figure 31:
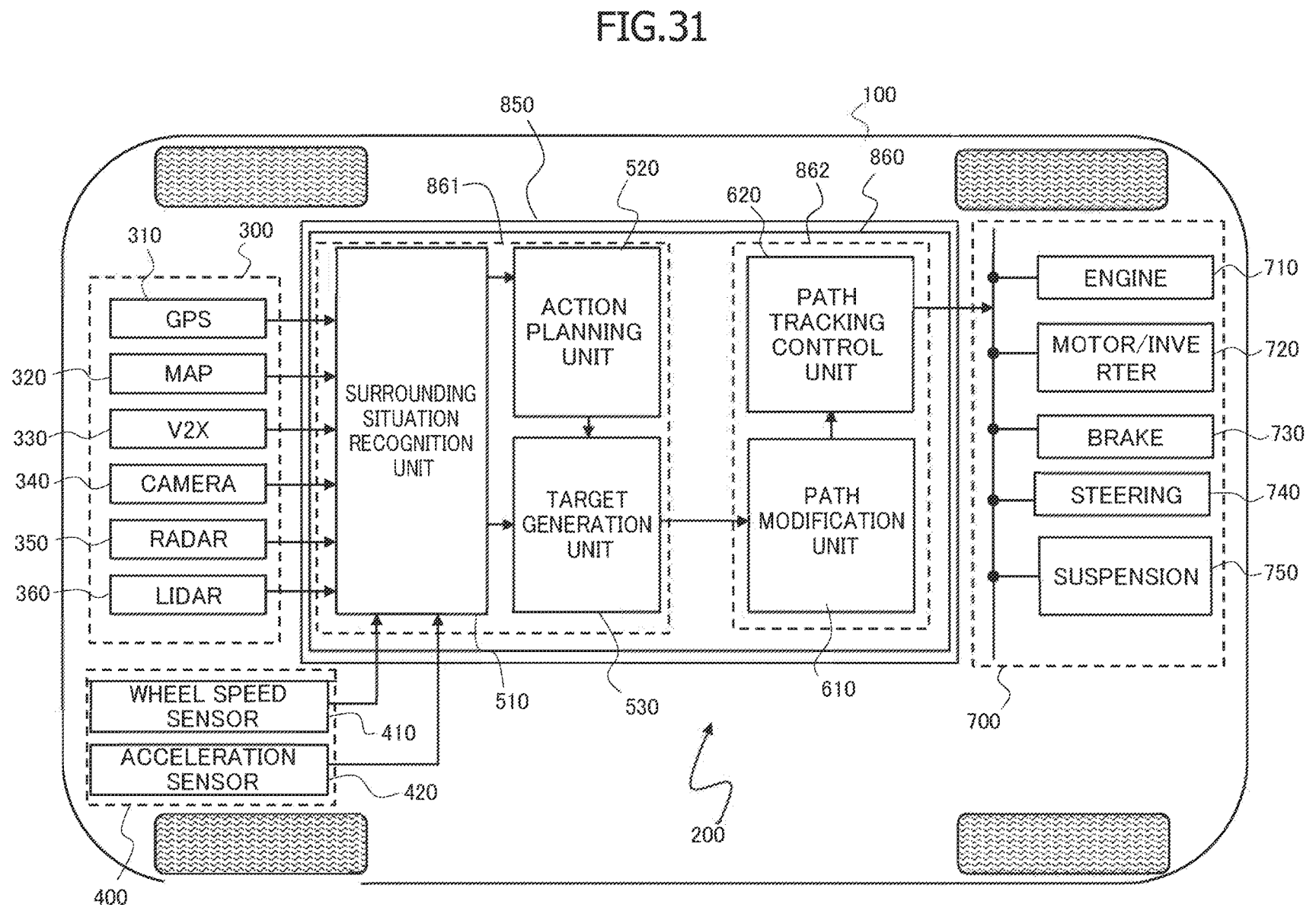

FIG. 31 illustrates a vehicle control system in which a single microcomputer is mounted on an integrated control unit.

Like elements between FIGS. 1 and 31 are denoted by like reference numerals, and detailed description thereof will be omitted.

Vehicle control system 200 illustrated in FIG. 31 has an integrated control unit 850 having a function as the recognition and determination unit and a function as the control unit. Integrated control unit 850 includes a single microcomputer 860 having the function of the recognition and determination unit and the function of the control unit as software functions.

That is, microcomputer 860 includes a first logic 861 (in other words, an upper unit logic or a recognition and determination logic) that embodies surrounding situation recognition unit 510, action planning unit 520, and target generation unit 530 and includes a second logic 862 (in other words, a lower unit logic or a control logic) that embodies path modification unit 610 and path tracking control unit 620.

In addition, first logic 861 sets a driving area based on information from external information recognition unit 300 and specifies information about the driving area to second logic 862.

Second logic 862 calculates a control command for driving vehicle 100 at a velocity and on a driving path that are based on specifications relating to driving of vehicle 100 within the driving area specified by first logic 861 and outputs the calculated control command to actuator unit 700.

In addition, in an integrated control unit on which first microcomputer and second microcomputer are mounted as illustrated in FIG. 30, the individual microcomputers may have calculation functions that are different from those illustrated in FIG. 30.

Figure 32:
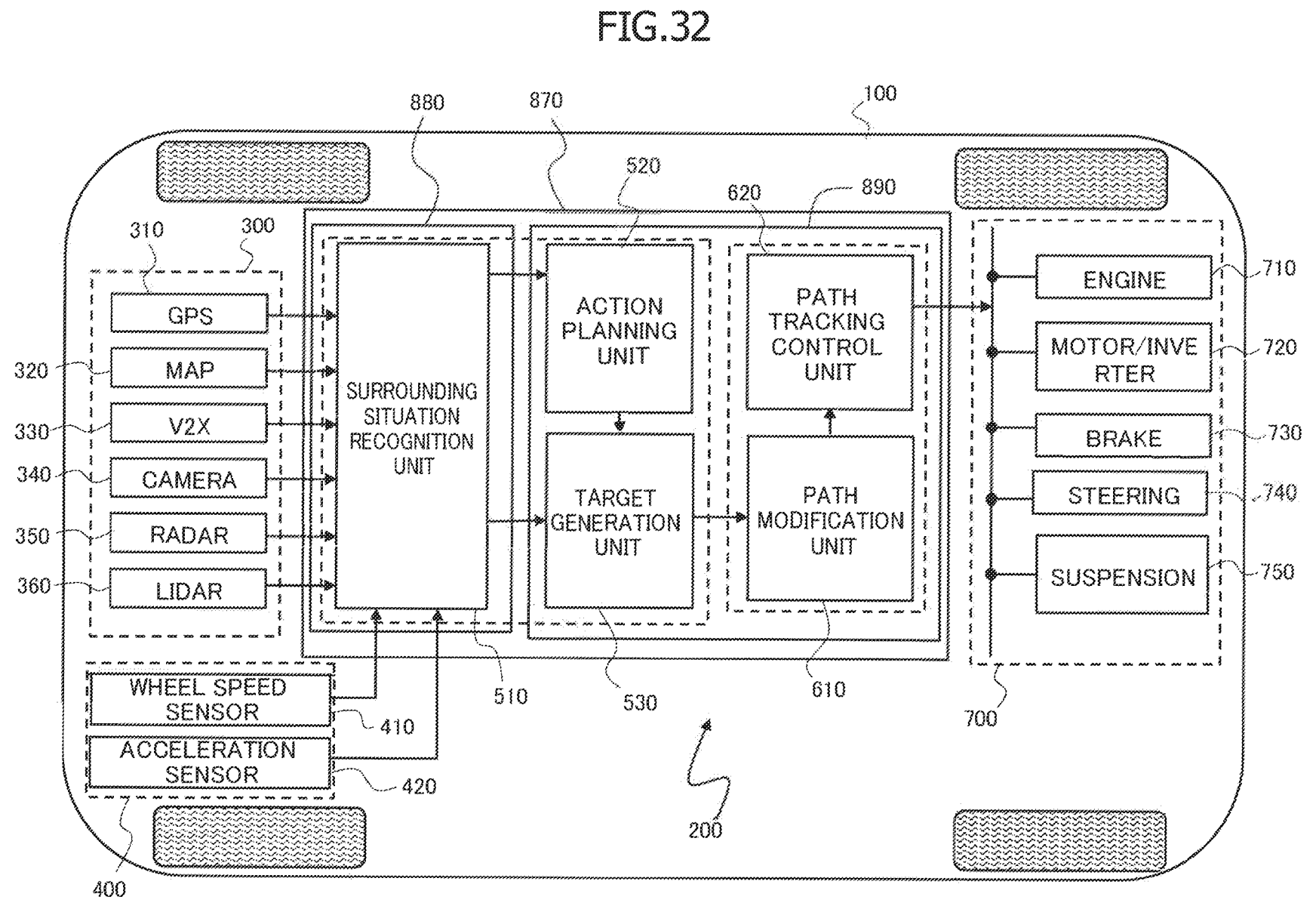

FIG. 32 illustrates vehicle control system 200 in which the individual microcomputers are assigned calculation functions differently from those illustrated in FIG. 30. Like elements between FIGS. 1 and 32 are denoted by like reference numerals, and detailed description thereof will be omitted.

An integrated control unit 870 illustrated in FIG. 32 includes a first microcomputer 880 and a second microcomputer 890.

First microcomputer 880 has surrounding situation recognition unit 510 as a software function, and second microcomputer 890 has action planning unit 520, target generation unit 530, path modification unit 610, and path tracking control unit 620 as software functions.

That is, first microcomputer 880 has only a part of the function of the recognition and determination unit, and second microcomputer 890 has the remaining function of the recognition and determination unit and the function of the control unit.

First microcomputer 880 may include the function of the recognition and determination unit and a part of the function of the control unit, and second microcomputer 890 may include the remaining function of the control unit.

The individual technical concepts described in the above examples can be appropriately combined and used as long as there is no conflict.

In addition, although the present invention has thus been described in detail with reference to preferable examples, it is apparent to those skilled in the art that various types of modification are possible, based on the basic technical concepts and teachings of the present invention.

For example, when a sudden situational change occurs, instead of specifying a new driving area based on the situational change to the control unit, the recognition and determination unit in vehicle control system 200 can specify road surface information or object information about the situational change to the control unit.

In addition, the recognition and determination unit in vehicle control system 200 can change the length of the driving area in the vehicle traveling direction and/or the period at which the driving area is specified, the length and/or the period being specified to the control unit, based on conditions such as the velocity of vehicle 100, the time interval from a preceding vehicle, or presence or absence of a preceding vehicle.

In addition, the recognition and determination unit in vehicle control system 200 can acquire meteorological information about an area around vehicle 100 (the direction of the wind, the speed of the wind, the amount of rainfall, the amount of snowfall, etc.) and can change the driving area that the recognition and determination unit specifies based on the meteorological information.

For example, when the recognition and determination unit in vehicle control system 200 specifies a driving area, if there is a strong lateral wind or if there is a possibility that vehicle 100 receives lateral wind from an approaching large vehicle or the like, the recognition and determination unit can specify a narrower driving area than that specified when the impact of lateral wind is less or can specify a driving area windward from the center of the traffic lane.

Based on the road surface information about an undulating road surface, a pothole, or the like that the control unit has acquired from the recognition and determination unit, the control unit can adjust the damping force or the vehicle height by controlling electronically controlled suspension 750.

In addition, when specifying a recommended path to the control unit, the recognition and determination unit in vehicle control system 200 can calculate a route that avoids an object as a recommended path.

In addition, vehicle control system 200 may be configured such that a person in vehicle 100 can freely select the priority of the ride quality (specifically, the allowable maximum lateral acceleration or the allowable maximum lateral jerk) by operating a mode setting switch or the like.

In addition, vehicle control system 200 may be configured such that the recognition and determination unit is installed outside vehicle 100 and such that the control unit mounted on vehicle 100 can wirelessly receive a target command including a driving area from the outside by using road-to-vehicle communication device 330 or the like.

In addition, when a driving area is set based on a collision risk area, information about a risk level may be included in information about the collision risk area, and the target vehicle velocity and/or target driving path may be changed based on the risk level.

For example, when the risk level is lower than a predetermined level, a driving path that passes through the collision risk area at a reduced target vehicle velocity may be set.

REFERENCE SYMBOL LIST

100 vehicle
200 vehicle control system
300 external information recognition unit
400 vehicle motion detection unit
500 automated driving control unit (first control unit)
510 surrounding situation recognition unit
520 action planning unit
530 target generation unit
540 microcomputer (recognition and determination unit)
600 vehicle motion control unit (second control unit, vehicle control device)
610 path modification unit
620 path tracking control unit
630 microcomputer (control unit)
700 actuator unit

The invention claimed is:

1. A vehicle control device comprising:
a control unit that performs calculation based on input information and outputs a calculation result, wherein the vehicle control device is mounted on a vehicle, the vehicle control device including an external information recognition unit that acquires external information about the vehicle, an actuator unit that generates driving force, braking force, and steering force applied to the vehicle, and a recognition and determination unit that calculates a first target command or a second target command based on an output signal of the recognition and determination unit,
wherein the control unit acquires, from the recognition and determination unit, information about a first driving area, which is a target driving area on which the vehicle runs and which is in front of the vehicle, as the first target command, and acquires, together with information about the first driving area, information about a minimum velocity value of the vehicle, a maximum velocity value of the vehicle, a maximum lateral acceleration value, and a maximum lateral jerk value at a predetermined location in the first driving area, which is specified by the recognition and determination unit, calculates a target velocity and a target driving path of the vehicle such that a magnitude of a lateral acceleration or a lateral jerk of the vehicle on a curve becomes less than a predetermined value within the first driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the first driving area, which is specified by the recognition and determination unit, and outputs to the actuator unit a first control command for driving the vehicle at the target velocity and on the target driving path, acquires, from the recognition and determination unit, information about a second driving area in front of the first driving area on which the vehicle runs, as the second target command, while the vehicle is running in the first driving area, the second driving area being along the same lane with the first driving area and partly overlapping the first driving area, and acquires, together with information on the second driving area, information on a minimum velocity value of the vehicle, a maximum velocity value of the vehicle, a maximum lateral acceleration value, and a maximum lateral jerk value at a predetermined location in the second driving area, which is specified by the recognition and determination unit, and calculates a target velocity and a target driving path of the vehicle such that a magnitude of a lateral acceleration or a lateral jerk of the vehicle on a curve becomes less than a predetermined value within the second driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the second driving area, which is specified by the recognition and determination unit, and outputs to the actuator unit a second control command for driving the vehicle at the target velocity and on the target driving path.

2. The vehicle control device according to claim 1, wherein the control unit acquires the second driving area after the vehicle runs in the first driving area for a predetermined time.

3. The vehicle control device according to claim 2, wherein, while the vehicle is running in the first driving area, if the control unit acquires information about a predetermined situational change in road surface information or object information in front of the vehicle from the recognition and determination unit, the control unit acquires the second driving area whether or not the vehicle has run in the first driving area for the predetermined time.

4. The vehicle control device according to claim 1, wherein the first driving area and the second driving area are each an area between right and left lane markers of a road or between right and left edges of the road.

5. The vehicle control device according to claim 1, wherein the first target command includes the first driving area and object information in front of the vehicle, and the second target command includes the second driving area and object information in front of the vehicle.

6. The vehicle control device according to claim 1, wherein the first driving area and the second driving area are each an area that does not include a collision risk area in front of the vehicle.

7. The vehicle control device according to claim 1, wherein the first target command or the second target command includes road surface information or object information in front of the vehicle.

8. The vehicle control device according to claim 1, wherein the first target command or the second target command includes a recommended path on which the vehicle runs in one of the first driving area or the second driving area.

9. The vehicle control device according to claim 1, wherein the control unit calculates the target driving path as an area having a probability that the vehicle runs.

10. A vehicle control method executed by a vehicle control device mounted on a vehicle, the vehicle control device including an external information recognition unit that acquires external information about the vehicle, an actuator unit that generates driving force, braking force, and steering force that are applied to the vehicle, a recognition and determination unit that calculates a first target command or a second target command based on an output signal of the external information recognition unit, the method comprising:

acquiring, from the recognition and determination unit, information about a first driving area, which is a target driving area on which the vehicle runs and which is in front of a vehicle, as the first target command, and acquiring, together with information about the first driving area, information about a minimum velocity value of the vehicle, a maximum velocity value of the vehicle, a maximum lateral acceleration value, and a maximum lateral jerk value at a predetermined location in the first driving area, which is specified by the recognition and determination unit;

calculating a target velocity and a target driving path of the vehicle such that a magnitude of a lateral acceleration or a lateral jerk of the vehicle on a curve becomes less than a predetermined value within the first driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the first driving area, which is specified by the recognition and determination unit, and outputting to the actuator unit a first control command for driving the vehicle at the target velocity and on the target driving path;

acquiring, from the recognition and determination unit, information about a second driving area in front of the first driving area on which the vehicle runs, as the second target command, while the vehicle is running in the first driving area, the second driving area being along the same lane with the first driving area and partly overlapping the first driving area, and acquiring, together with information on the second driving area, information on a minimum velocity value of the vehicle, a maximum velocity value of the vehicle, a maximum lateral acceleration value, and a maximum lateral jerk value at a predetermined location in the second driving area, which is specified by the recognition and determination unit; and calculating a target velocity and a target driving path of the vehicle such that a magnitude of a lateral acceleration or a lateral jerk of the vehicle on a curve becomes less than a predetermined value within the second driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the second driving area, which is specified by the recognition and determination unit, and outputting to the actuator unit a second control command for driving the vehicle at the target velocity and on the target driving path.

11. A vehicle control system comprising:

an external information recognition unit that acquires external information about a vehicle;

an actuator unit that generates driving force, braking force, and steering force that are applied to the vehicle;

a recognition and determination unit that calculates a first target command or a second target command based on an output signal of the external information recognition unit; and a control unit that acquires, from the recognition and determination unit, information about a first driving area, which is a target driving area on which the vehicle runs and which is in front of the vehicle, as the first target command, and acquires, together with information about the first driving area, information about a minimum velocity value of the vehicle, a maximum velocity value of the vehicle, a maximum lateral acceleration value, and a maximum lateral jerk value at a predetermined location in the first driving area, which is specified by the recognition and determination unit, calculates a target velocity and a target driving path of the vehicle such that a magnitude of a lateral acceleration or a lateral jerk of the vehicle on a curve becomes less than a predetermined value within the first driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the first driving area, which is specified by the recognition and determination unit, and outputs to the actuator unit a first control command for driving the vehicle at the target velocity and on the target driving path;

acquires, from the recognition and determination unit, information about a second driving area in front of the first driving area on which the vehicle runs, as the second target command, while the vehicle is running in the first driving area, the second driving area being along the same lane with the first driving area and partly overlapping the first driving area, and acquires, together with information on the second driving area, information on a minimum velocity value of the vehicle, a maximum velocity value of the vehicle, a maximum lateral acceleration value, and a maximum lateral jerk value at a predetermined location in the second driving area, which is specified by the recognition and determination unit, and calculates a target velocity and a target driving path of the vehicle such that a magnitude of a lateral acceleration or a lateral jerk of the vehicle on a curve becomes less than a predetermined value within the second driving area, or such that the magnitude of the lateral acceleration or the lateral jerk of the vehicle is minimized within ranges of the minimum velocity value of the vehicle, the maximum velocity value of the vehicle, the maximum lateral acceleration value, and the maximum lateral jerk value at the predetermined location in the second driving area, which is specified by the recognition and determination unit, and outputs to the actuator unit a second control command for driving the vehicle at the target velocity and on the target driving path.

12. The vehicle control system according to claim 11, wherein the recognition and determination unit is provided in an upper control unit mounted on the vehicle, and the control unit is provided in a lower control unit mounted on the vehicle, which is provided separately from the upper control unit.

13. The vehicle control system according to claim 11, further comprising: an integrated control unit that includes a first microcomputer and a second microcomputer in a single housing, wherein the first microcomputer has the recognition and determination unit as a software function, and the second microcomputer has, as a software function, a control unit that outputs a control command.

14. The vehicle control system according to claim 11, further comprising: an integrated control unit that includes a single microcomputer, wherein the single microcomputer has a function of the recognition and determination unit and a function of the control unit as software functions.

* * * * *